(12) United States Patent
Raichelgauz et al.

(10) Patent No.: US 10,706,094 B2
(45) Date of Patent: Jul. 7, 2020

(54) SYSTEM AND METHOD FOR CUSTOMIZING A DISPLAY OF A USER DEVICE BASED ON MULTIMEDIA CONTENT ELEMENT SIGNATURES

(71) Applicant: Cortica, Ltd., Tel Aviv (IL)

(72) Inventors: Igal Raichelgauz, Tel Aviv (IL);
Karina Odinaev, Tel Aviv (IL);
Yehoshua Y Zeevi, Haifa (IL)

(73) Assignee: CORTICA LTD, Tel Aviv (IL)

( * ) Notice: Subject to any disclaimer, the term of this patent is extended or adjusted under 35 U.S.C. 154(b) by 314 days.

(21) Appl. No.: 15/601,303

(22) Filed: May 22, 2017

(65) Prior Publication Data

US 2017/0262437 A1    Sep. 14, 2017

Related U.S. Application Data

(63) Continuation-in-part of application No. 15/259,907, filed on Sep. 8, 2016, now Pat. No. 10,193,990, which
(Continued)

(30) Foreign Application Priority Data

Oct. 26, 2005  (IL) .......................................... 171577
Jan. 29, 2006  (IL) .......................................... 173409
Aug. 21, 2007  (IL) .......................................... 185414

(51) Int. Cl.
*G06F 17/30*     (2006.01)
*G06F 16/41*     (2019.01)
(Continued)

(52) U.S. Cl.
CPC .............. *G06F 16/41* (2019.01); *G06F 16/14* (2019.01); *G06F 16/152* (2019.01);
(Continued)

(58) Field of Classification Search
None
See application file for complete search history.

(56) References Cited

U.S. PATENT DOCUMENTS 4,733,353 A    3/1988 Jaswa
4,932,645 A    6/1990 Schorey et al.
(Continued)

FOREIGN PATENT DOCUMENTS

EP    1085464 A3    1/2007
WO    0231764       4/2002
(Continued)

OTHER PUBLICATIONS

Boari et al, "Adaptive Routing for Dynamic Applications in Massively Parallel Architectures", 1995 IEEE, Spring 1995.
(Continued)

*Primary Examiner* — Hung D Le
(74) *Attorney, Agent, or Firm* — Reches Patent

(57) ABSTRACT

A system and method customizing a display of a user device based on multimedia content elements. The method may include detecting a trigger event; identifying a user profile of the user device, wherein the user profile includes one or more signatures indicating a user interest; accessing signatures for a plurality of multimedia content elements; comparing the signatures of at least one of the plurality of multimedia content elements with the one or more signature of the user profile; and customizing the display of the user device, wherein the customized display includes the at least one interesting multimedia content element.

24 Claims, 8 Drawing Sheets

Related U.S. Application Data is a continuation-in-part of application No. 15/206,792, filed on Jul. 11, 2016, which is a continuation-in-part of application No. 14/509,558, filed on Oct. 8, 2014, now Pat. No. 9,575,969, which is a continuation of application No. 13/602,858, filed on Sep. 4, 2012, now Pat. No. 8,868,619, which is a continuation of application No. 12/603,123, filed on Oct. 21, 2009, now Pat. No. 8,266,185, which is a continuation-in-part of application No. 12/084,150, filed as application No. PCT/IL2006/001235 on Oct. 26, 2006, now Pat. No. 8,655,801, said application No. 12/603,123 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 12/603,123 is a continuation-in-part of application No. 12/348,888, filed on Jan. 5, 2009, now Pat. No. 9,798,795, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, said application No. 12/603,123 is a continuation-in-part of application No. 12/538,495, filed on Aug. 10, 2009, now Pat. No. 8,312,031, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, and a continuation-in-part of application No. 12/348,888, filed on Jan. 5, 2009, now Pat. No. 9,798,795.

(60) Provisional application No. 62/339,912, filed on May 22, 2016, provisional application No. 62/292,387, filed on Feb. 8, 2016, provisional application No. 62/292,338, filed on Feb. 8, 2016, provisional application No. 62/289,187, filed on Jan. 30, 2016.

(51) Int. Cl.
*G06F 16/14* (2019.01)
*H04L 29/08* (2006.01)
*G06K 9/00* (2006.01)
*G06F 16/435* (2019.01)

(52) U.S. Cl.
CPC ....... *G06F 16/435* (2019.01); *G06K 9/00744* (2013.01); *H04L 67/22* (2013.01); *H04L 67/306* (2013.01); *Y10S 707/99943* (2013.01); *Y10S 707/99948* (2013.01)

(56) References Cited

U.S. PATENT DOCUMENTS

| | | | |
|---|---|---|---|
| 4,972,363 A | 11/1990 | Nguyen et al. | |
| 5,078,501 A | 1/1992 | Hekker et al. | |
| 5,214,746 A | 5/1993 | Fogel et al. | |
| 5,307,451 A | 4/1994 | Clark | |
| 5,314,419 A | 5/1994 | Pelling | |
| 5,412,564 A | 5/1995 | Ecer | |
| 5,436,653 A | 7/1995 | Ellis et al. | |
| 5,546,405 A | 8/1996 | Golla | |
| 5,568,181 A | 10/1996 | Greenwood et al. | |
| 5,638,425 A | 6/1997 | Meador et al. | |
| 5,745,678 A | 4/1998 | Herzberg et al. | |
| 5,754,938 A | 5/1998 | Herz et al. | |
| 5,763,069 A | 6/1998 | Jordan | |
| 5,806,061 A | 9/1998 | Chaudhuri et al. | |
| 5,835,087 A * | 11/1998 | Herz | G06Q 20/383 715/810 |
| 5,835,901 A | 11/1998 | Duvoisin et al. | |
| 5,852,435 A | 12/1998 | Vigneaux et al. | |
| 5,870,754 A | 2/1999 | Dimitrova et al. | |
| 5,873,080 A | 2/1999 | Coden et al. | |
| 5,887,193 A | 3/1999 | Takahashi et al. | |
| 5,926,812 A | 7/1999 | Hilsenrath et al. | |
| 5,940,821 A | 8/1999 | Wical | |
| 5,978,754 A | 11/1999 | Kumano | |
| 5,987,454 A | 11/1999 | Hobbs | |
| 5,991,306 A | 11/1999 | Burns et al. | |
| 6,038,560 A | 3/2000 | Wical | |
| 6,052,481 A | 4/2000 | Grajski et al. | |
| 6,070,167 A | 5/2000 | Qian et al. | |
| 6,076,088 A | 6/2000 | Paik et al. | |
| 6,122,628 A | 9/2000 | Castelli et al. | |
| 6,128,651 A | 10/2000 | Cezar | |
| 6,137,911 A | 10/2000 | Zhilyaev | |
| 6,144,767 A | 11/2000 | Bottou et al. | |
| 6,147,636 A | 11/2000 | Gershenson | |
| 6,163,510 A * | 12/2000 | Lee | G06Q 99/00 386/281 |
| 6,240,423 B1 | 5/2001 | Hirata | |
| 6,243,375 B1 | 6/2001 | Speicher | |
| 6,243,713 B1 | 6/2001 | Nelson et al. | |
| 6,275,599 B1 | 8/2001 | Adler et al. | |
| 6,329,986 B1 | 12/2001 | Cheng | |
| 6,363,373 B1 | 3/2002 | Steinkraus | |
| 6,381,656 B1 | 4/2002 | Shankman | |
| 6,411,229 B2 | 6/2002 | Kobayashi | |
| 6,422,617 B1 | 7/2002 | Fukumoto et al. | |
| 6,493,692 B1 | 12/2002 | Kobayashi et al. | |
| 6,493,705 B1 | 12/2002 | Kobayashi et al. | |
| 6,507,672 B1 | 1/2003 | Watkins et al. | |
| 6,523,022 B1 | 2/2003 | Hobbs | |
| 6,523,046 B2 | 2/2003 | Liu et al. | |
| 6,524,861 B1 | 2/2003 | Anderson | |
| 6,526,400 B1 | 2/2003 | Takata et al. | |
| 6,550,018 B1 | 4/2003 | Abonamah et al. | |
| 6,557,042 B1 | 4/2003 | He et al. | |
| 6,560,597 B1 | 5/2003 | Dhillon et al. | |
| 6,594,699 B1 | 7/2003 | Sahai et al. | |
| 6,601,026 B2 | 7/2003 | Appelt et al. | |
| 6,601,060 B1 | 7/2003 | Tomaru | |
| 6,611,628 B1 | 8/2003 | Sekiguchi et al. | |
| 6,611,837 B2 | 8/2003 | Schreiber | |
| 6,618,711 B1 | 9/2003 | Ananth | |
| 6,643,620 B1 | 11/2003 | Contolini et al. | |
| 6,643,643 B1 | 11/2003 | Lee et al. | |
| 6,665,657 B1 | 12/2003 | Dibachi | |
| 6,675,159 B1 | 1/2004 | Lin et al. | |
| 6,681,032 B2 | 1/2004 | Bortolussi et al. | |
| 6,704,725 B1 | 3/2004 | Lee | |
| 6,728,706 B2 | 4/2004 | Aggarwal et al. | |
| 6,732,149 B1 | 5/2004 | Kephart | |
| 6,742,094 B2 | 5/2004 | Igari | |
| 6,751,363 B1 | 6/2004 | Natsev et al. | |
| 6,751,613 B1 | 6/2004 | Lee et al. | |
| 6,754,435 B2 | 6/2004 | Kim | |
| 6,763,069 B1 | 7/2004 | Divakaran et al. | |
| 6,763,519 B1 | 7/2004 | McColl et al. | |
| 6,774,917 B1 | 8/2004 | Foote et al. | |
| 6,795,818 B1 | 9/2004 | Lee | |
| 6,804,356 B1 | 10/2004 | Krishnamachari | |
| 6,813,395 B1 | 11/2004 | Kinjo | |
| 6,819,797 B1 | 11/2004 | Smith et al. | |
| 6,836,776 B2 | 12/2004 | Schreiber | |
| 6,845,374 B1 | 1/2005 | Oliver et al. | |
| 6,877,134 B1 | 4/2005 | Fuller et al. | |
| 6,901,207 B1 | 5/2005 | Watkins | |
| 6,938,025 B1 | 8/2005 | Lulich et al. | |
| 6,970,881 B1 | 11/2005 | Mohan et al. | |
| 6,978,264 B2 | 12/2005 | Chandrasekar et al. | |
| 6,985,172 B1 | 1/2006 | Rigney et al. | |
| 7,006,689 B2 | 2/2006 | Kasutani | |
| 7,013,051 B2 | 3/2006 | Sekiguchi et al. | |
| 7,020,654 B1 | 3/2006 | Najmi | |

(56) References Cited

U.S. PATENT DOCUMENTS

| | | | |
|---|---|---|---|
| 7,023,979 B1 * | 4/2006 | Wu | H04M 3/5233 379/265.11 |
| 7,043,473 B1 | 5/2006 | Rassool et al. | |
| 7,124,149 B2 | 10/2006 | Smith et al. | |
| 7,158,681 B2 | 1/2007 | Persiantsev | |
| 7,199,798 B1 | 4/2007 | Echigo et al. | |
| 7,215,828 B2 | 5/2007 | Luo | |
| 7,260,564 B1 | 8/2007 | Lynn et al. | |
| 7,277,928 B2 | 10/2007 | Lennon | |
| 7,289,643 B2 | 10/2007 | Brunk et al. | |
| 7,296,012 B2 | 11/2007 | Ohashi | |
| 7,299,261 B1 | 11/2007 | Oliver et al. | |
| 7,302,089 B1 | 11/2007 | Smits | |
| 7,302,117 B2 | 11/2007 | Sekiguchi et al. | |
| 7,313,805 B1 | 12/2007 | Rosin et al. | |
| 7,340,358 B2 | 3/2008 | Yoneyama | |
| 7,346,629 B2 | 3/2008 | Kapur et al. | |
| 7,353,224 B2 | 4/2008 | Chen et al. | |
| 7,376,672 B2 | 5/2008 | Weare | |
| 7,383,179 B2 | 6/2008 | Alves et al. | |
| 7,392,238 B1 | 6/2008 | Zhou et al. | |
| 7,406,459 B2 | 7/2008 | Chen et al. | |
| 7,433,895 B2 | 10/2008 | Li et al. | |
| 7,450,740 B2 | 11/2008 | Shah et al. | |
| 7,464,086 B2 | 12/2008 | Black et al. | |
| 7,523,102 B2 | 4/2009 | Bjarnestam et al. | |
| 7,526,607 B1 | 4/2009 | Singh et al. | |
| 7,529,659 B2 | 5/2009 | Wold | |
| 7,536,384 B2 | 5/2009 | Venkataraman et al. | |
| 7,542,969 B1 | 6/2009 | Rappaport et al. | |
| 7,548,910 B1 | 6/2009 | Chu | |
| 7,555,477 B2 | 6/2009 | Bayley et al. | |
| 7,555,478 B2 | 6/2009 | Bayley et al. | |
| 7,562,076 B2 | 7/2009 | Kapur | |
| 7,574,436 B2 | 8/2009 | Kapur et al. | |
| 7,574,668 B2 | 8/2009 | Nunez et al. | |
| 7,577,656 B2 | 8/2009 | Kawai et al. | |
| 7,657,100 B2 | 2/2010 | Gokturk et al. | |
| 7,660,468 B2 | 2/2010 | Gokturk et al. | |
| 7,694,318 B2 | 4/2010 | Eldering et al. | |
| 7,805,446 B2 | 9/2010 | Potok et al. | |
| 7,836,054 B2 | 11/2010 | Kawai et al. | |
| 7,860,895 B1 | 12/2010 | Scofield et al. | |
| 7,872,669 B2 | 1/2011 | Darrell et al. | |
| 7,920,894 B2 | 4/2011 | Wyler | |
| 7,921,107 B2 | 4/2011 | Chang et al. | |
| 7,921,288 B1 | 4/2011 | Hildebrand | |
| 7,933,407 B2 | 4/2011 | Keidar et al. | |
| 7,974,994 B2 | 7/2011 | Li et al. | |
| 7,987,194 B1 | 7/2011 | Walker et al. | |
| 7,987,217 B2 | 7/2011 | Long et al. | |
| 7,991,715 B2 | 8/2011 | Schiff et al. | |
| 8,000,655 B2 | 8/2011 | Wang et al. | |
| 8,023,739 B2 | 9/2011 | Hohimer et al. | |
| 8,036,893 B2 | 10/2011 | Reich | |
| 8,098,934 B2 | 1/2012 | Vincent | |
| 8,112,376 B2 | 2/2012 | Raichelgauz et al. | |
| 8,266,185 B2 | 9/2012 | Raichelgauz et al. | |
| 8,285,718 B1 * | 10/2012 | Ong | G06K 9/00288 707/737 |
| 8,312,031 B2 | 11/2012 | Raichelgauz et al. | |
| 8,315,442 B2 | 11/2012 | Gokturk et al. | |
| 8,316,005 B2 | 11/2012 | Moore | |
| 8,326,775 B2 | 12/2012 | Raichelgauz et al. | |
| 8,345,982 B2 | 1/2013 | Gokturk et al. | |
| 8,386,400 B2 | 2/2013 | Raichelgauz et al. | |
| 8,396,876 B2 * | 3/2013 | Kennedy | G06F 16/48 707/748 |
| 8,418,206 B2 | 4/2013 | Bryant et al. | |
| 8,442,321 B1 | 5/2013 | Chang et al. | |
| 8,457,827 B1 | 6/2013 | Ferguson et al. | |
| 8,495,489 B1 | 7/2013 | Everingham | |
| 8,548,828 B1 | 10/2013 | Longmire | |
| 8,635,531 B2 | 1/2014 | Graham et al. | |
| 8,655,801 B2 | 2/2014 | Raichelgauz et al. | |
| 8,655,878 B1 | 2/2014 | Kulkarni et al. | |
| 8,677,377 B2 | 3/2014 | Cheyer et al. | |
| 8,682,667 B2 | 3/2014 | Haughay | |
| 8,688,446 B2 | 4/2014 | Yanagihara | |
| 8,706,503 B2 | 4/2014 | Cheyer et al. | |
| 8,775,442 B2 | 7/2014 | Moore et al. | |
| 8,799,195 B2 | 8/2014 | Raichelgauz et al. | |
| 8,799,196 B2 | 8/2014 | Raichelquaz et al. | |
| 8,818,916 B2 | 8/2014 | Raichelgauz et al. | |
| 8,868,619 B2 | 10/2014 | Raichelgauz et al. | |
| 8,868,861 B2 | 10/2014 | Shimizu et al. | |
| 8,880,539 B2 | 11/2014 | Raichelgauz et al. | |
| 8,880,566 B2 | 11/2014 | Raichelgauz et al. | |
| 8,886,648 B1 | 11/2014 | Procopio et al. | |
| 8,898,568 B2 | 11/2014 | Bull et al. | |
| 8,922,414 B2 | 12/2014 | Raichelgauz et al. | |
| 8,954,887 B1 | 2/2015 | Tseng et al. | |
| 8,959,037 B2 | 2/2015 | Raichelgauz et al. | |
| 8,990,125 B2 | 3/2015 | Raichelgauz et al. | |
| 8,990,199 B1 | 3/2015 | Ramesh et al. | |
| 9,009,086 B2 | 4/2015 | Raichelgauz et al. | |
| 9,031,999 B2 | 5/2015 | Raichelgauz et al. | |
| 9,087,049 B2 | 7/2015 | Raichelgauz et al. | |
| 9,104,747 B2 | 8/2015 | Raichelgauz et al. | |
| 9,165,406 B1 | 10/2015 | Gray et al. | |
| 9,191,626 B2 | 11/2015 | Raichelgauz et al. | |
| 9,197,244 B2 | 11/2015 | Raichelgauz et al. | |
| 9,218,606 B2 | 12/2015 | Raichelgauz et al. | |
| 9,235,557 B2 | 1/2016 | Raichelgauz et al. | |
| 9,256,668 B2 | 2/2016 | Raichelgauz et al. | |
| 9,311,308 B2 * | 4/2016 | Sankarasubramaniam | H04N 21/4532 |
| 9,323,754 B2 | 4/2016 | Ramanathan et al. | |
| 9,330,189 B2 | 5/2016 | Raichelgauz et al. | |
| 9,438,270 B2 | 9/2016 | Raichelgauz et al. | |
| 9,466,068 B2 | 10/2016 | Raichelgauz et al. | |
| 9,646,006 B2 | 5/2017 | Raichelgauz et al. | |
| 9,679,062 B2 | 6/2017 | Schillings et al. | |
| 9,807,442 B2 | 10/2017 | Bhatia et al. | |
| 9,875,445 B2 | 1/2018 | Amer et al. | |
| 9,984,369 B2 | 5/2018 | Li et al. | |
| 2001/0019633 A1 | 9/2001 | Tenze et al. | |
| 2001/0034219 A1 | 10/2001 | Hewitt et al. | |
| 2001/0038876 A1 | 11/2001 | Anderson | |
| 2001/0056427 A1 | 12/2001 | Yoon et al. | |
| 2002/0004743 A1 | 1/2002 | Kutaragi et al. | |
| 2002/0010682 A1 | 1/2002 | Johnson | |
| 2002/0010715 A1 | 1/2002 | Chinn et al. | |
| 2002/0019881 A1 | 2/2002 | Bokhari et al. | |
| 2002/0019882 A1 | 2/2002 | Soejima et al. | |
| 2002/0032677 A1 | 3/2002 | Morgenthaler et al. | |
| 2002/0037010 A1 | 3/2002 | Yamauchi | |
| 2002/0038299 A1 | 3/2002 | Zernik et al. | |
| 2002/0042914 A1 | 4/2002 | Walker et al. | |
| 2002/0059580 A1 | 5/2002 | Kalker et al. | |
| 2002/0072935 A1 | 6/2002 | Rowse et al. | |
| 2002/0087530 A1 | 7/2002 | Smith et al. | |
| 2002/0087828 A1 | 7/2002 | Arimilli et al. | |
| 2002/0091947 A1 | 7/2002 | Nakamura | |
| 2002/0099870 A1 | 7/2002 | Miller et al. | |
| 2002/0107827 A1 | 8/2002 | Benitez-Jimenez et al. | |
| 2002/0113812 A1 * | 8/2002 | Walker | G06F 16/252 715/719 |
| 2002/0123928 A1 | 9/2002 | Eldering et al. | |
| 2002/0126002 A1 | 9/2002 | Patchell | |
| 2002/0126872 A1 | 9/2002 | Brunk et al. | |
| 2002/0129140 A1 | 9/2002 | Peled et al. | |
| 2002/0129296 A1 | 9/2002 | Kwiat et al. | |
| 2002/0143976 A1 | 10/2002 | Barker et al. | |
| 2002/0147637 A1 | 10/2002 | Kraft et al. | |
| 2002/0152267 A1 | 10/2002 | Lennon | |
| 2002/0157116 A1 * | 10/2002 | Jasinschi | G06K 9/00711 725/136 |
| 2002/0159640 A1 | 10/2002 | Vaithilingam et al. | |
| 2002/0161739 A1 | 10/2002 | Oh | |
| 2002/0163532 A1 | 11/2002 | Thomas et al. | |
| 2002/0174095 A1 | 11/2002 | Lulich et al. | |
| 2002/0178410 A1 | 11/2002 | Haitsma et al. | |
| 2002/0184505 A1 | 12/2002 | Mihcak et al. | |

(56) References Cited

U.S. PATENT DOCUMENTS

| | | |
|---|---|---|
| 2003/0004966 A1 | 1/2003 | Bolle et al. |
| 2003/0005432 A1 | 1/2003 | Ellis et al. |
| 2003/0028660 A1 | 2/2003 | Igawa et al. |
| 2003/0037010 A1 | 2/2003 | Schmelzer |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0093790 A1 | 5/2003 | Logan et al. |
| 2003/0101150 A1 | 5/2003 | Agnihotri et al. |
| 2003/0105739 A1 | 6/2003 | Essafi et al. |
| 2003/0110236 A1* | 6/2003 | Yang ............... H04L 29/06 709/219 |
| 2003/0115191 A1 | 6/2003 | Copperman et al. |
| 2003/0126147 A1 | 7/2003 | Essafi et al. |
| 2003/0140257 A1 | 7/2003 | Peterka et al. |
| 2003/0165269 A1 | 9/2003 | Fedorovskaya et al. |
| 2003/0174859 A1 | 9/2003 | Kim |
| 2003/0182567 A1 | 9/2003 | Barton et al. |
| 2003/0184598 A1 | 10/2003 | Graham |
| 2003/0191764 A1 | 10/2003 | Richards |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0095376 A1 | 5/2004 | Graham et al. |
| 2004/0098671 A1 | 5/2004 | Graham et al. |
| 2004/0107181 A1 | 6/2004 | Rodden |
| 2004/0111432 A1 | 6/2004 | Adams et al. |
| 2004/0111465 A1 | 6/2004 | Chuang et al. |
| 2004/0117367 A1 | 6/2004 | Smith et al. |
| 2004/0117638 A1 | 6/2004 | Monroe |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0162820 A1 | 8/2004 | James et al. |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0021394 A1 | 1/2005 | Miedema et al. |
| 2005/0080788 A1 | 4/2005 | Murata |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0163375 A1 | 7/2005 | Grady |
| 2005/0172130 A1 | 8/2005 | Roberts |
| 2005/0177372 A1 | 8/2005 | Wang et al. |
| 2005/0226511 A1 | 10/2005 | Short |
| 2005/0238198 A1 | 10/2005 | Brown et al. |
| 2005/0238238 A1 | 10/2005 | Xu et al. |
| 2005/0245241 A1 | 11/2005 | Durand et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Check et al. |
| 2006/0004745 A1 | 1/2006 | Kuhn et al. |
| 2006/0013451 A1 | 1/2006 | Haitsma |
| 2006/0015580 A1 | 1/2006 | Gabriel et al. |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0033163 A1 | 2/2006 | Chen |
| 2006/0041596 A1 | 2/2006 | Stirbu et al. |
| 2006/0048191 A1 | 3/2006 | Xiong |
| 2006/0050993 A1 | 3/2006 | Stentiford |
| 2006/0064037 A1 | 3/2006 | Shalon et al. |
| 2006/0069668 A1 | 3/2006 | Braddy et al. |
| 2006/0080311 A1 | 4/2006 | Potok et al. |
| 2006/0112035 A1 | 5/2006 | Cecchi et al. |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton et al. |
| 2006/0251338 A1 | 11/2006 | Gokturk et al. |
| 2006/0253423 A1 | 11/2006 | McLane et al. |
| 2006/0288002 A1 | 12/2006 | Epstein et al. |
| 2007/0009159 A1 | 1/2007 | Fan |
| 2007/0011151 A1 | 1/2007 | Hagar et al. |
| 2007/0019864 A1 | 1/2007 | Koyama et al. |
| 2007/0022374 A1 | 1/2007 | Huang et al. |
| 2007/0033163 A1 | 2/2007 | Epstein et al. |
| 2007/0033170 A1* | 2/2007 | Sull ............... G06T 3/4092 |
| 2007/0038608 A1 | 2/2007 | Chen |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130112 A1 | 6/2007 | Lin |
| 2007/0130159 A1 | 6/2007 | Gulli et al. |
| 2007/0136782 A1 | 6/2007 | Ramaswamy et al. |
| 2007/0156720 A1 | 7/2007 | Maren |
| 2007/0168413 A1 | 7/2007 | Barletta et al. |
| 2007/0174320 A1 | 7/2007 | Chou |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2007/0298152 A1 | 12/2007 | Baets |
| 2008/0046406 A1 | 2/2008 | Seide et al. |
| 2008/0049629 A1 | 2/2008 | Morrill |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0091527 A1 | 4/2008 | Silverbrook et al. |
| 2008/0152231 A1 | 6/2008 | Gokturk et al. |
| 2008/0159622 A1 | 7/2008 | Agnihotri et al. |
| 2008/0163288 A1 | 7/2008 | Ghosal et al. |
| 2008/0165861 A1 | 7/2008 | Wen et al. |
| 2008/0172615 A1 | 7/2008 | Igelman et al. |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0247543 A1 | 10/2008 | Mick et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0294278 A1 | 11/2008 | Borgeson et al. |
| 2008/0307454 A1 | 12/2008 | Ahanger et al. |
| 2008/0313140 A1 | 12/2008 | Pereira et al. |
| 2009/0013414 A1 | 1/2009 | Washington et al. |
| 2009/0022472 A1 | 1/2009 | Bronstein et al. |

(56) References Cited

U.S. PATENT DOCUMENTS

| | | |
|---|---|---|
| 2009/0024641 A1 | 1/2009 | Quigley et al. |
| 2009/0037088 A1 | 2/2009 | Taguchi |
| 2009/0037408 A1 | 2/2009 | Rodgers |
| 2009/0043637 A1 | 2/2009 | Eder |
| 2009/0089587 A1 | 4/2009 | Brunk et al. |
| 2009/0096634 A1 | 4/2009 | Emam et al. |
| 2009/0119157 A1 | 5/2009 | Dulepet |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0165031 A1 | 6/2009 | Li et al. |
| 2009/0172030 A1 | 7/2009 | Schiff et al. |
| 2009/0175538 A1 | 7/2009 | Bronstein et al. |
| 2009/0208106 A1 | 8/2009 | Dunlop et al. |
| 2009/0208118 A1 | 8/2009 | Csurka |
| 2009/0216761 A1 | 8/2009 | Raichelgauz et al. |
| 2009/0220138 A1 | 9/2009 | Zhang et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0254572 A1 | 10/2009 | Redlich et al. |
| 2009/0277322 A1 | 11/2009 | Cai et al. |
| 2009/0282218 A1 | 11/2009 | Raichelgauz et al. |
| 2009/0297048 A1 | 12/2009 | Slotine et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0162405 A1 | 6/2010 | Cook et al. |
| 2010/0173269 A1 | 7/2010 | Puri et al. |
| 2010/0191391 A1 | 7/2010 | Zeng |
| 2010/0198626 A1 | 8/2010 | Cho et al. |
| 2010/0212015 A1 | 8/2010 | Jin et al. |
| 2010/0268524 A1 | 10/2010 | Nath et al. |
| 2010/0284604 A1 | 11/2010 | Chrysanthakopoulos |
| 2010/0293057 A1 | 11/2010 | Haveliwala et al. |
| 2010/0306193 A1 | 12/2010 | Pereira et al. |
| 2010/0312736 A1 | 12/2010 | Kello |
| 2010/0318493 A1 | 12/2010 | Wessling |
| 2010/0322522 A1 | 12/2010 | Wang et al. |
| 2010/0325138 A1 | 12/2010 | Lee et al. |
| 2010/0325581 A1 | 12/2010 | Finkelstein et al. |
| 2011/0035373 A1 | 2/2011 | Berg et al. |
| 2011/0052063 A1 | 3/2011 | McAuley et al. |
| 2011/0055585 A1 | 3/2011 | Lee |
| 2011/0145068 A1 | 6/2011 | King et al. |
| 2011/0164180 A1 | 7/2011 | Lee |
| 2011/0164810 A1 | 7/2011 | Zang et al. |
| 2011/0202848 A1 | 8/2011 | Ismalon |
| 2011/0216209 A1 | 9/2011 | Fredlund et al. |
| 2011/0218946 A1 | 9/2011 | Stern et al. |
| 2011/0246566 A1 | 10/2011 | Kashef et al. |
| 2011/0251896 A1 | 10/2011 | Impollonia et al. |
| 2011/0276680 A1 | 11/2011 | Rimon |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0136853 A1* | 5/2012 | Kennedy ............. G06F 16/48 707/723 |
| 2012/0150890 A1 | 6/2012 | Jeong et al. |
| 2012/0167133 A1 | 6/2012 | Carroll et al. |
| 2012/0179642 A1 | 7/2012 | Sweeney et al. |
| 2012/0185445 A1 | 7/2012 | Borden et al. |
| 2012/0197857 A1 | 8/2012 | Huang |
| 2012/0207346 A1 | 8/2012 | Kohli et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0265735 A1 | 10/2012 | McMillan et al. |
| 2012/0294514 A1 | 11/2012 | Saunders et al. |
| 2012/0299961 A1 | 11/2012 | Ramkumar et al. |
| 2012/0301105 A1 | 11/2012 | Rehg et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0043990 A1 | 2/2013 | Al-Jafar |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0104251 A1 | 4/2013 | Moore et al. |
| 2013/0151522 A1 | 6/2013 | Aggarwal et al. |
| 2013/0159298 A1 | 6/2013 | Mason et al. |
| 2013/0173635 A1 | 7/2013 | Sanjeev |
| 2013/0226930 A1 | 8/2013 | Amgren et al. |
| 2013/0227023 A1 | 8/2013 | Raichelgauz et al. |
| 2013/0283401 A1 | 10/2013 | Pabla et al. |
| 2013/0325550 A1 | 12/2013 | Varghese et al. |
| 2013/0332951 A1 | 12/2013 | Gharaat et al. |
| 2013/0346412 A1 | 12/2013 | Raichelgauz et al. |
| 2014/0019264 A1 | 1/2014 | Ivachman et al. |
| 2014/0025692 A1 | 1/2014 | Pappas |
| 2014/0125703 A1 | 5/2014 | Roveta et al. |
| 2014/0147829 A1 | 5/2014 | Jerauld |
| 2014/0149918 A1 | 5/2014 | Asokan et al. |
| 2014/0152698 A1 | 6/2014 | Kim et al. |
| 2014/0156691 A1* | 6/2014 | Conwell ............. G06Q 10/00 707/758 |
| 2014/0169681 A1 | 6/2014 | Drake |
| 2014/0176604 A1 | 6/2014 | Venkitaraman et al. |
| 2014/0188786 A1 | 7/2014 | Raichelgauz et al. |
| 2014/0193077 A1 | 7/2014 | Shiiyama et al. |
| 2014/0198986 A1 | 7/2014 | Marchesotti |
| 2014/0201330 A1 | 7/2014 | Lopez et al. |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0330830 A1 | 11/2014 | Raichelgauz et al. |
| 2014/0341476 A1 | 11/2014 | Kulick et al. |
| 2014/0363044 A1 | 12/2014 | Williams et al. |
| 2015/0052089 A1* | 2/2015 | Kozloski ............. G06Q 10/10 706/12 |
| 2015/0100562 A1 | 4/2015 | Kohlmeier et al. |
| 2015/0117784 A1 | 4/2015 | Lin et al. |
| 2015/0120627 A1 | 4/2015 | Hunzinger et al. |
| 2015/0127516 A1 | 5/2015 | Studnitzer et al. |
| 2015/0248586 A1 | 9/2015 | Gaidon et al. |
| 2015/0254344 A1 | 9/2015 | Kulkami et al. |
| 2015/0286742 A1 | 10/2015 | Zhang et al. |
| 2015/0286872 A1 | 10/2015 | Medioni et al. |
| 2015/0289022 A1 | 10/2015 | Gross |
| 2015/0324356 A1 | 11/2015 | Gutierrez et al. |
| 2015/0332588 A1 | 11/2015 | Bulan et al. |
| 2016/0007083 A1 | 1/2016 | Gurha |
| 2016/0026707 A1 | 1/2016 | Ong et al. |
| 2016/0132194 A1* | 5/2016 | Grue ............. G06F 3/0482 715/810 |
| 2016/0221592 A1 | 8/2016 | Puttagunta et al. |
| 2016/0275766 A1 | 9/2016 | Venetianer et al. |
| 2016/0306798 A1 | 10/2016 | Guo et al. |
| 2017/0017638 A1 | 1/2017 | Satyavarta et al. |
| 2017/0154241 A1 | 6/2017 | Shambik et al. |
| 2018/0108258 A1 | 4/2018 | Dilger |
| 2018/0157903 A1 | 6/2018 | Tu et al. |
| 2018/0189613 A1 | 7/2018 | Wolf et al. |
| 2018/0373929 A1 | 12/2018 | Ye |
| 2019/0096135 A1 | 3/2019 | Mutto et al. |
| 2019/0171912 A1 | 6/2019 | Vallespi-Gonzalez et al. |
| 2019/0279046 A1 | 9/2019 | Han et al. |
| 2019/0304102 A1 | 10/2019 | Chen et al. |

FOREIGN PATENT DOCUMENTS

| | | |
|---|---|---|
| WO | 0231764 A2 | 4/2002 |
| WO | 2003005242 A1 | 1/2003 |
| WO | 2003067467 A1 | 8/2003 |
| WO | 2004019527 A1 | 3/2004 |
| WO | 2005027457 A1 | 3/2005 |
| WO | 2007049282 A2 | 5/2007 |
| WO | 20070049282 | 5/2007 |

(56) References Cited

FOREIGN PATENT DOCUMENTS

| WO | 2014076002 A1 | 5/2014 |
|---|---|---|
| WO | 2014137337 A1 | 9/2014 |
| WO | 2016040376 A1 | 3/2016 |
| WO | 2016070193 A1 | 5/2016 |

OTHER PUBLICATIONS

Brecheisen, et al., "Hierarchical Genre Classification for Large Music Collections", ICME 2006, pp. 1385-1388.
Cernansky et al., "Feed-forward Echo State Networks"; Proceedings of International Joint Conference on Neural Networks, Montreal, Canada, Jul. 31-Aug. 4, 2005; Entire Document.
Chuan-Yu Cho, et al., "Efficient Motion-Vector-Based Video Search Using Query by Clip", 2004, IEEE, Taiwan, pp. 1-4.
Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.
Cococcioni, et al, "Automatic Diagnosis of Defects of Rolling Element Bearings Based on Computational Intelligence Techniques", University of Pisa, Pisa, Italy, 2009.
Emami, et al, "Role of Spatiotemporal Oriented Energy Features for Robust Visual Tracking in Video Surveillance, University of Queensland", St. Lucia, Australia, 2012.
Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.
Foote, Jonathan et al., "Content-Based Retrieval of Music and Audio"; 1997, Institute of Systems Science, National University of Singapore, Singapore (Abstract).
Gomes et al., "Audio Watermaking and Fingerprinting: For Which Applications?" University of Rene Descartes, Paris, France, 2003.
Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.
Guo et al, "AdOn: An Intelligent Overlay Video Advertising System", SIGIR, Boston, Massachusetts, Jul. 19-23, 2009.
Howlett et al., "A Multi-Computer Neural Network Architecture in a Virtual Sensor System Application", International Journal of Knowledge-based Intelligent Engineering Systems, 4 (2). pp. 86-93, 133N 1327-2314, Mar. 10, 2000.
Ihab Al Kabary, et al., "SportSense: Using Motion Queries to Find Scenes in Sports Videos", Oct. 2013, ACM, Switzerland, pp. 1-3.
International Search Authority: "Written Opinion of the International Searching Authority" (PCT Rule 43bis.1) including International Search Report for the related International Patent Application No. PCT/US2008/073852; dated Jan. 28, 2009; Entire Document.
International Search Authority: International Preliminary Report on Patentability (Chapter I of the Patent Cooperation Treaty) including "Written Opinion of the International Searching Authority" (PCT Rule 43bis. 1) for the related International Patent Application No. PCT/IL2006/001235; dated Jul. 28, 2009.
International Search Report for the related International Patent Application PCT/IL2006/001235; dated Nov. 2, 2008.
IPO Examination Report under Section 18(3) for corresponding UK application No. GB1001219.3, dated May 30, 2012.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Jaeger, H.: "The "echo state" approach to analysing and training recurrent neural networks", GMD Report, No. 148, 2001, pp. 1-43, XP002466251 German National Research Center for Information Technology.

Jianping Fan et al., "Concept-Oriented Indexing of Video Databases: Towards Semantic Sensitive Retrieval and Browsing", IEEE, vol. 13, No. 7, Jul. 2004, pp. 1-19.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.
Lin, C.; Chang, S.: "Generating Robust Digital Signature for Image/Video Authentication", Multimedia and Security Workshop at ACM Mutlimedia '98; Bristol, U.K., Sep. 1998; pp. 49-54.
Lin, et al., "Robust Digital Signature for Multimedia Authentication: A Summary", IEEE Circuits and Systems Magazine, 4th Quarter 2003, pp. 23-26.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Maass, W. et al.: "Computational Models for Generic Cortical Microcircuits", Institute for Theoretical Computer Science, Technische Universitaet Graz, Graz, Austria, published Jun. 10, 2003.
Mandhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
May et al., "The Transputer", Springer-Verlag, Berlin Heidelberg, 1989, teaches multiprocessing system.
McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.
Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.
Nagy et al, "A Transputer, Based, Flexible, Real-Time Control System for Robotic Manipulators", UKACC International Conference on CONTROL '96, Sep. 2-5, 1996, Conference 1996, Conference Publication No. 427, IEE 1996.
Nam, et al., "Audio Visual Content-Based Violent Scene Characterization", Department of Electrical and Computer Engineering, Minneapolis, MN, 1998, pp. 353-357.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.

(56) References Cited

OTHER PUBLICATIONS

Odinaev, et al., "Cliques in Neural Ensembles as Perception Carriers", Technion—Israel Institute of Technology, 2006 International Joint Conference on Neural Networks, Canada, 2006, pp. 285-292.

Ortiz-Boyer et al., "CIXL2: A Crossover Operator for Evolutionary Algorithms Based on Population Features", Journal of Artificial Intelligence Research 24 (2005), pp. 1-48 Submitted Nov. 2004; published Jul. 2005.

Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.

Ribert et al. "An Incremental Hierarchical Clustering", Visicon Interface 1999, pp. 586-591.

Santos, et al., "SCORM-MPEG: an Ontology of Interoperable Metadata for Multimedia and e-Learning", 2015 23rd International Conference on Software, Telecommunications and Computer Networks (SoftCOM) Year: 2015, pp. 224-228, DOI: 10.1109/SOFTCOM. 2015.7314122 IEEE Conference Publications.

Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

Semizarov et al. "Specificity of Short Interfering RNA Determined through Gene Expression Signatures", PNAS, 2003, pp. 6347-6352.

Shih-Fu Chang, et al., "VideoQ: A Fully Automated Video Retrieval System Using Motion Sketches", 1998, IEEE, , New York, pp. 1-2.

The International Search Report and the Written Opinion for PCT/US2016/054634 dated Mar. 16, 2017, ISA/RU, Moscow, RU.

Theodoropoulos et al, "Simulating Asynchronous Architectures on Transputer Networks", Proceedings of the Fourth Euromicro Workshop on Parallel and Distributed Processing, 1996. PDP '96.

Vailaya, et al., "Content-Based Hierarchical Classification of Vacation Images," I.E.E.E.: Multimedia Computing and Systems, vol. 1, 1999, East Lansing, MI, pp. 518-523.

Vallet, et al., "Personalized Content Retrieval in Context Using Ontological Knowledge," IEEE Transactions on Circuits and Systems for Video Technology, vol. 17, No. 3, Mar. 2007, pp. 336-346.

Verstraeten et al., "Isolated word recognition with the Liquid State Machine; a case study"; Department of Electronics and Information Systems, Ghent University, Sint-Pietersnieuwstraat 41, 9000 Gent, Belgium, Available online Jul. 14, 2005; Entire Document.

Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.

Wang et al. "A Signature for Content-based Image Retrieval Using a Geometrical Transform", ACM 1998, pp. 229-234.

Wei-Te Li et al., "Exploring Visual and Motion Saliency for Automatic Video Object Extraction", IEEE, vol. 22, No. 7, Jul. 2013, pp. 1-11.

Whitby-Strevens, "The Transputer", 1985 IEEE, Bristol, UK.

Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/ NetSys.2015.7089081 IEEE Conference Publications.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

Yanai, "Generic Image Classification Using Visual Knowledge on the Web," MM'03, Nov. 2-8, 2003, Tokyo, Japan, pp. 167-176.

Zang, et al., "A New Multimedia Message Customizing Framework for Mobile Devices", Multimedia and Expo, 2007 IEEE International Conference on Year: 2007, pp. 1043-1046, DOI: 10.1109/ ICME.2007.4284832 IEEE Conference Publications.

Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.

Zhou et al., "Ensembling neural networks: Many could be better than all"; National Laboratory for Novel Software Technology, Nanjing Unviersirty, Hankou Road 22, Nanjing 210093, PR China; Available online Mar. 12, 2002; Entire Document.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.

Ma et el. ("Semantics modeling based image retrieval system using neural networks" 2005 (Year: 2005).

"Computer Vision Demonstration Website", Electronics and Computer Science, University of Southampton, 2005, USA.

Guo et al, AdOn: An Intelligent Overlay Video Advertising System (Year: 2009).

Li et al ("Matching Commercial Clips from TV Streams Using a Unique, Robust and Compact Signature" 2005) (Year: 2005).

Stolberg et al ("Hibrid-SoC: A Multi-Core SoC Architecture for Multimedia Signal Processing" 2003).

Vallet et al ("Personalized Content Retrieval in Context Using Ontological Knowledge" Mar. 2007) (Year: 2007).

Big Bang Theory Series 04 Episode 12, aired Jan. 6, 2011; [retrieved from Internet:].

Boari et al, "Adaptive Routing for Dynamic Applications in Massively Parallel Architectures", 1995 IEEE, Spring 1995, pp. 1-14.

Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al, "Feed-forward Echo State Networks", Proceedings of International Joint Conference on Neural Networks, Montreal, Canada, Jul. 31-Aug. 4, 2005, pp. 1-4.

Chinchor, Nancy A. et al.; Multimedia Analysis + Visual Analytics = Multimedia Analytics; IEEE Computer Society; 2010; pp. 52-60. (Year: 2010).

Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.

Freisleben et al, "Recognition of Fractal Images Using a Neural Network", Lecture Notes in Computer Science, 1993, vol. 6861, 1993, pp. 631-637.

Garcia, "Solving the Weighted Region Least Cost Path Problem Using Transputers", Naval Postgraduate School, Monterey, California, Dec. 1989.

Hogue, "Tree Pattern Inference and Matching for Wrapper Induction on the World Wide Web", Master's Thesis, Massachusetts Institute of Technology, Jun. 2004, pp. 1-106.

Howlett et al, "A Multi-Computer Neural Network Architecture in a Virtual Sensor System Application", International journal of knowledge-based intelligent engineering systems, 4 (2). pp. 86-93, 133N 1327-2314.

Hua et al., "Robust Video Signature Based on Ordinal Measure", Image Processing, 2004, 2004 International Conference on Image Processing (ICIP), vol. 1, IEEE, pp. 685-688, 2004.

International Search Report and Written Opinion for PCT/US2016/ 050471, ISA/RU, Moscow, RU, dated May 4, 2017.

International Search Report and Written Opinion for PCT/US2016/ 054634, ISA/RU, Moscow, RU, dated Mar. 16, 2017.

International Search Report and Written Opinion for PCT/US2017/ 015831, ISA/RU, Moscow, RU, dated Apr. 20, 2017.

Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.

Lau et al., "Semantic Web Service Adaptation Model for a Pervasive Learning Scenario", 2008 IEEE Conference on Innovative Technologies in Intelligent Systems and Industrial Applications, 2008, pp. 98-103.

(56) References Cited

OTHER PUBLICATIONS

Lin et al., "Generating robust digital signature for image/video authentication", Multimedia and Security Workshop at ACM Multimedia '98, Bristol, U.K., Sep. 1998, pp. 245-251.

Lu et al, "Structural Digital Signature for Image Authentication: An Incidental Distortion Resistant Scheme", IEEE Transactions on Multimedia, vol. 5, No. 2, Jun. 2003, pp. 161-173.

Lyon, "Computational Models of Neural Auditory Processing", IEEE International Conference on Acoustics, Speech, and Signal Processing, ICASSP '84, Date of Conference: Mar. 1984, vol. 9, pp. 41-44.

Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.

May et al, "The Transputer", Springer-Verlag Berlin Heidelberg 1989, vol. 41.

McNamara et al., "Diversity Decay in opportunistic Content Sharing Systems", 2011 IEEE International Symposium on a World of Wireless, Mobile and Multimedia Networks, pp. 1-3.

Morad et al., "Performance, Power Efficiency and Scalability of Asymmetric Cluster Chip Multiprocessors", Computer Architecture Letters, vol. 4, Jul. 4, 2005, pp. 1-4, XP002466254.

Nagy et al, "A Transputer, Based, Flexible, Real-Time Control System for Robotic Manipulators", UKACC International Conference on CONTROL '96, Sep. 2-5, 1996, Conference Publication No. 427, IEE 1996.

Natschlager et al., "The "Liquid Computer": A novel strategy for real-time computing on time series", Special Issue on Foundations of Information Processing of telematik, vol. 8, No. 1, 2002, pp. 39-43, XP002466253.

Odinaev et al, "Cliques in Neural Ensembles as Perception Carriers", Technion—Institute of Technology, 2006 International Joint Conference on neural Networks, Canada, 2006, pp. 285-292.

Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.

Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).

Queluz, "Content-Based Integrity Protection of Digital Images", SPIE Conf. on Security and Watermarking of Multimedia Contents, San Jose, Jan. 1999, pp. 85-93.

Rui, Yong et al. "Relevance feedback: a power tool for interactive content-based image retrieval." IEEE Transactions on circuits and systems for video technology 8.5 (1998): 644-655.

Santos et al., "SCORM-MPEG: an Ontology of Interoperable Metadata for multimediaand E-Learning", 23rd International Conference on Software, Telecommunications and Computer Networks (SoftCom), 2015, pp. 224-228.

Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.

Schneider et al, "A Robust Content based Digital Signature for Image Authentication", Proc. ICIP 1996, Lausane, Switzerland, Oct. 1996, pp. 227-230.

Srihari et al., "Intelligent Indexing and Semantic Retrieval of Multimodal Documents", Kluwer Academic Publishers, May 2000, vol. 2, Issue 2-3, pp. 245-275.

Srihari, Rohini K. "Automatic indexing and content-based retrieval of captioned images" Computer 0 (1995): 49-56.

Stolberg et al, "Hibrid-SoC: A Mul ti-Core SoC Architecture for Mul timedia Signal Processing", 2003 IEEE, pp. 189-194.

Theodoropoulos et al, "Simulating Asynchronous Architectures on Transputer Networks", Proceedings of the Fourth Euromicro Workshop on Parallel and Distributed Processing, 1996. PDP '96, pp. 274-281.

Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.

Wang et al., "Classifying Objectionable Websites Based onImage Content", Stanford University, pp. 1-12.

Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.

Whitby-Strevens, "The transputer", 1985 IEEE, pp. 292-300.

Wilk et al., "The Potential of Social-Aware Multimedia Prefetching on Mobile Devices", International Conference and Workshops on networked Systems (NetSys), 2015, pp. 1-5.

Yanagawa et al, "Columbia University's Baseline Detectors for 374 LSCOM Semantic Visual Concepts", Columbia University ADVENT Technical Report # 222-2006-8, Mar. 20, 2007, pp. 1-17.

Yanagawa et al., "Columbia University's Baseline Detectors for 374 LSCOM Semantic Visual Concepts", Columbia University ADVENT Technical Report #222, 2007, pp. 2006-2008.

Zhou et al, "Ensembling neural networks: Many could be better than all", National Laboratory for Novel Software Technology, Nanjing University, Hankou Road 22, Nanjing 210093, PR China, Available online Mar. 12, 2002, pp. 239-263.

Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.

Zhu et al., "Technology-Assisted Dietary Assesment", Proc SPIE. Mar. 20, 2008, pp. 1-15.

Zou et al., "A Content-Based Image Authentication System with Lossless Data Hiding", ICME 2003, pp. 213-216.

Ma Et El "Semantics modeling based image retrieval system using neural networks", 2005.

\* cited by examiner

SYSTEM AND METHOD FOR CUSTOMIZING A DISPLAY OF A USER DEVICE BASED ON MULTIMEDIA CONTENT ELEMENT SIGNATURES

CROSS-REFERENCE TO RELATED APPLICATIONS

This application claims the benefit of U.S. Provisional Application No. 62/339,912 filed on May 22, 2016. This application is also a continuation-in-part (CIP) of U.S. patent application Ser. No. 15/259,907 filed on Sep. 8, 2016, now pending, which claims the benefit of US Provisional Patent Application No. 62/292,387 filed on Feb. 8, 2016 and US Provisional Patent Application No. 62/292,388 filed on Feb. 8, 2016. The Ser. No. 15/259,907 application is a CIP of U.S. patent application Ser. No. 15/206,792 filed on Jul. 11, 2016, now pending, which claims the benefit of US Provisional Patent Application No. 62/289,187 filed on Jan. 30, 2016. The Ser. No. 15/206,792 Application is also a CIP of U.S. patent application Ser. No. 14/509,558 filed on Oct. 8, 2014, now U.S. Pat. No. 9,575,969, which is a continuation of U.S. patent application Ser. No. 13/602,858 filed on Sep. 4, 2012, now U.S. Pat. No. 8,868,619. The Ser. No. 13/602,858 Application is a continuation of U.S. patent application Ser. No. 12/603,123 filed on Oct. 21, 2009, now U.S. Pat. No. 8,266,185. The Ser. No. 12/603,123 Application is a continuation-in-part of:

(a) U.S. patent application Ser. No. 12/084,150 having a filing date of Apr. 7, 2009, now U.S. Pat. No. 8,655,801, which is the National Stage of International Application No. PCT/IL2006/001235 filed on Oct. 26, 2006, which claims foreign priority from Israeli Application No. 171577 filed on Oct. 26, 2005, and Israeli Application No. 173409 filed on Jan. 29, 2006;

(b) U.S. patent application Ser. No. 12/195,863 filed on Aug. 21, 2008, now U.S. Pat. No. 8,326,775, which claims priority under 35 USC 119 from Israeli Application No. 185414 filed on Aug. 21, 2007, and which is also a continuation-in-part of the above-referenced U.S. patent application Ser. No. 12/084,150; and (c) U.S. patent application Ser. No. 12/348,888, filed on Jan. 5, 2009, now pending, which is a CIP of the above-referenced U.S. patent application Ser. Nos. 12/084,150 and 12/195,863; and (d) U.S. patent application Ser. No. 12/538,495 filed on Aug. 10, 2009, now U.S. Pat. No. 8,312,031, which is a CIP of the above-referenced U.S. patent application Ser. Nos. 12/084,150, 12/195,863, and 12/348,888.

All of the applications referenced above are herein incorporated by reference for all that they contain.

TECHNICAL FIELD

The present disclosure relates generally to analysis of multimedia content, and more specifically to a system and method for customizing a display of a user device based on an analysis of multimedia content elements.

BACKGROUND

Search engines are common tools used for finding relevant information over the world-wide web. Search engines are additionally implemented to search items locally with a user device, such as a personal computer or a smart phone. A search query is entered by a user into such a search engine in order to receive search results, either from the world wide web or from a local device. The search query may be in a form of a textual query, an image, or an audio query.

Searching for multimedia content elements (e.g., pictures, video clips, audio clips, etc.) stored locally on the user device as well as on the web may prove to be a difficult task. According to some existing solutions, an input query for multimedia contents is utilized to search through metadata of the available multimedia content elements. The metadata is typically associated with a multimedia content element and includes parameters such as the element's size, type, name, and short description, and so on. The description and name of the element are typically provided by the creator of the element and/or by a person storing the element in, e.g., a local device or a remote database. Therefore, metadata of an element, in most cases, is not sufficiently descriptive of the multimedia element. For example, a user may save a picture of a cat under the file name of "weekend fun." In such a scenario, the metadata would not be sufficiently descriptive of the contents of the picture to enable a user to easily search for said picture using the word "cat." Thus, searching for multimedia content elements based solely on their metadata may not provide the most accurate results.

In computer science, a tag is a non-hierarchical keyword or term assigned to a piece of information, such as multimedia content elements. Tagging, or associated a tag with a particular content element, has gained wide popularity due to the growth of social networking, photograph sharing, and bookmarking of websites. Some websites allow users to create and manage tags that categorize content using simple keywords. The users of such sites manually add and define the description of the tags. However, some websites limit the tagging options of multimedia elements, for example, by only allowing tagging of people and not object shown in a picture. Therefore, searching for all multimedia content elements solely based on the tags would not be efficient.

Additionally, existing solutions provide several tools to identify users' preferences. Some of these existing solutions attempt to identify and recommend content that is similar to content enjoyed by the user based on information noted by tags of the content such as, for example, subject matter, the entity that created the content, actors or actresses appearing in the content, and the like. However, as noted above, tags are often incomplete or inaccurate. As a result, such tag-based solutions also face challenges based on lack of accurate information regarding what content the user has viewed and whether the user enjoyed such content.

It would be therefore advantageous to provide a solution that overcomes the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for customizing a display of a user device based on multimedia content element signatures, where the method includes: detecting a trigger event; upon detecting the trigger event, identifying a user profile of the user device, wherein the user profile includes at least one signature indicating at least one user interest, each signature representing a concept, wherein each concept is a collection of signatures and metadata representing the concept; comparing the at least one signature of the user profile to a plurality of signatures of multimedia content elements; determining, based on the comparison, at least one interesting multimedia content element, wherein the at least one interesting multimedia content element is relevant to at least one of the at least one user interest; and customizing the display of the user device, wherein the customized display includes the at least one interesting multimedia content element.

Certain embodiments disclosed herein include a non-transitory computer readable medium having stored thereon instructions for causing one or more processing units to execute a method, the method including detecting a trigger event; upon detecting the trigger event, identifying a user profile of the user device, wherein the user profile includes at least one signature indicating at least one user interest, each signature representing a concept, wherein each concept is a collection of signatures and metadata representing the concept; comparing the at least one signature of the user profile to a plurality of signatures of multimedia content elements; determining, based on the comparison, at least one interesting multimedia content element, wherein the at least one interesting multimedia content element is relevant to at least one of the at least one user interest; and customizing the display of the user device, wherein the customized display includes the at least one interesting multimedia content element Certain embodiments disclosed herein include a system for customizing a display of a user device based on multi-media content element signatures, where the method includes: detecting a trigger event; upon detecting the trigger event, identifying a user profile of the user device, wherein the user profile includes at least one signature indicating at least one user interest, each signature representing a concept, wherein each concept is a collection of signatures and metadata representing the concept; comparing the at least one signature of the user profile to a plurality of signatures of multimedia content elements; determining, based on the comparison, at least one interesting multimedia content element, wherein the at least one interesting multimedia content element is relevant to at least one of the at least one user interest; and customizing the display of the user device, wherein the customized display includes the at least one interesting multimedia content element.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
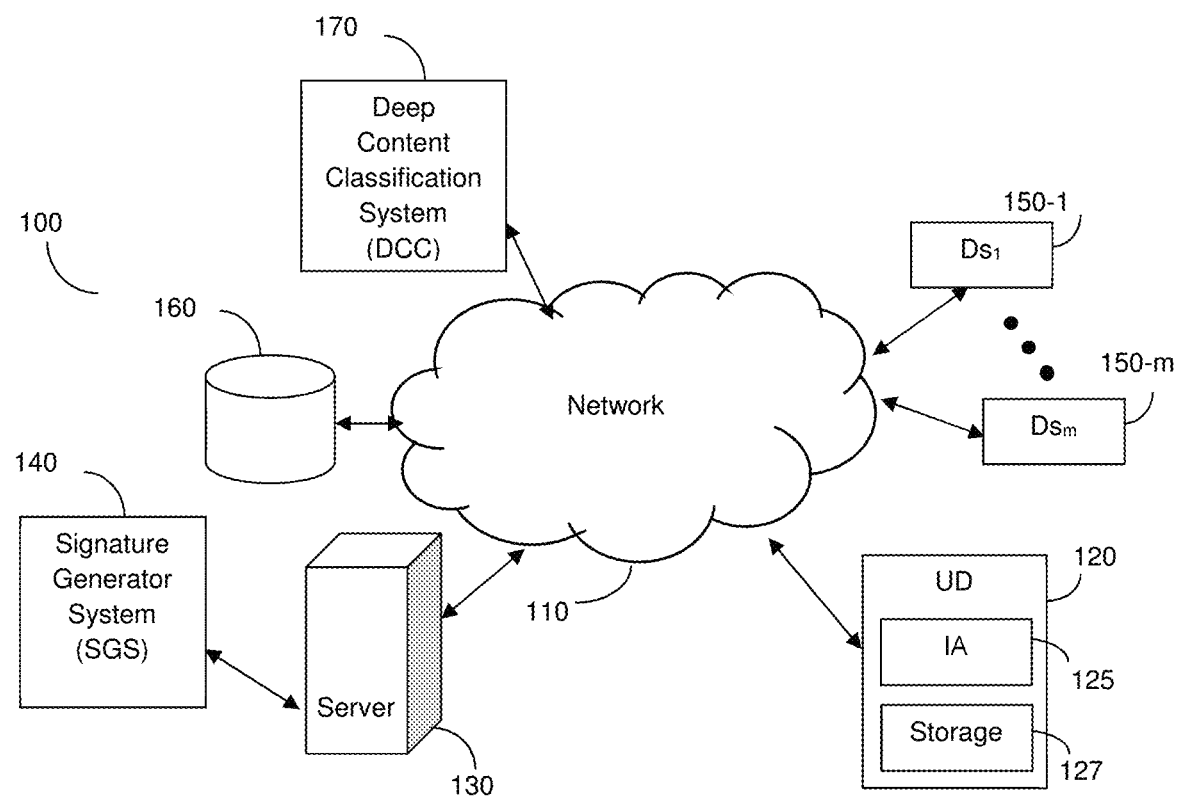
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for customizing a display of a user device based on multimedia content elements. One or more data sources associated with a user are accessed to identify a plurality of multimedia content elements stored therein. At least one signature is generated for each identified multimedia content element, where each generated signature represents a concept. The generated signatures are analyzed to generate contextual insights. Based on the contextual insights and at least one profile variable, current user interests are determined. A user profile indicating the current user interests is generated. As a non-limiting example, the user profile may indicate that the user is interested in "bicycle," "extreme sport," "outdoor activity," and the like.

Based on the user profile, a display of a user device is customized. To this end, data sources are searched through to identify an interesting multimedia content element that is relevant to at least one of the user interests. The interesting multimedia content element may be obtained. The interesting multimedia content element is caused to be displayed on the user device, thereby customizing the display.

FIG. 1 shows an example schematic diagram of a network system 100 utilized to describe the various embodiments disclosed herein. A network 110 is used to communicate between different parts of the system. The network 110 may be the Internet, the world-wide-web (WWW), a local area network (LAN), a wide area network (WAN), a metro area network (MAN), and other networks capable of enabling communication between the elements of the system 100.

Further connected to the network 110 is a user device 120. The user device 120 may be, but is not limited to, a personal computer (PC), a personal digital assistant (PDA), a mobile phone, a smart phone, a tablet computer, an electronic wearable device (e.g., glasses, a watch, etc.), a smart television, or another kind of wired or mobile device equipped with browsing, viewing, capturing, storing, listening, filtering, and managing capabilities enabled as further discussed herein below.

In some embodiments, the user device 120 may have installed therein an interest analyzer 125. The interest analyzer 125 may be a dedicated application, script, or any program code stored in a memory of the user device 120 and is executable, for example, by a processing system (e.g., microprocessor) of the user device 120. The interest analyzer 125 may be configured to perform some or all of the processes performed by a server 130 and disclosed herein. It should be noted that only one user device 120 and one interest analyzer 125 are discussed with reference to FIG. 1 merely for the sake of simplicity. The embodiments disclosed herein are applicable to a plurality of user devices that can access the server 130, and each user device may have multiple applications installed thereon.

In some embodiments, the interest analyzer 125 is located on the server 130, and the user device is configured to communicate with the interest analyzer 125 through the network 110.

In another embodiment, the user device 120 may include a local storage 127. The local storage 127 may include multimedia content captured or received by the user device 120. For example, the local storage 127 may include photographs and videos either captured via a camera (not shown) of the user device 120 or downloaded from a website (e.g., via the network 110).

Also communicatively connected to the network 110 is a data warehouse 160 that stores multimedia content elements associated with a user of the user device 120. According to an embodiment, the data warehouse 160 may be associated with a social network the user belongs to. According to another embodiment, the data warehouse 160 may be a cloud-based storage accessible by the user device 120. In the embodiment illustrated in FIG. 1, a server 130 communicatively communicates with the data warehouse 160 through the network 110. Such communication may be subject to an approval received from the user device 120.

In an example embodiment, a signature generator system (SGS) 140 and a deep-content classification (DCC) system 170 are connected to the network 110 and may be utilized by the server 130 to perform the various disclosed embodiments. Each of the SGS 140 and the DCC system 170 may be connected to the server 130 directly or through the network 110. In certain configurations, the SGS 140, the DCC system 170, or both may be embedded in the server 130. It should be noted that the server 130 typically comprises a processing system (not shown) such as a processor and a memory (not shown). The processing system is coupled to the memory, which is configured to contain instructions that can be executed by the processing system. The server 130 also includes a network interface (not shown) to the network 110. In one embodiment, the server 130 is communicatively connected to or includes an array of computational cores (not shown) configured as discussed in more detail herein below.

A plurality of web sources 150-1 through **150-*m* (hereinafter referred to individually as a web source 150 and collectively as web sources 150, merely for simplicity purposes) are further communicatively connected to the network 110 and accessible by the server 130. The web sources 150 may include, but are not limited to, a search engine, a content provider server, a vertical comparison engine, a content publisher server, a mobile application installed on the user device, a social network, a content website, a combination thereof, and the like. The web sources 150 generate, store, or otherwise serve multimedia content elements utilized for generating contextual insights. Alternatively or collectively, the multimedia content elements utilized for generating contextual insights may be stored in the local storage 127 of the user device 120, a storage of the server 130**, or both.

A multimedia content element may be, but is not limited to, an image, a graphic, a video stream, a video clip, an audio stream, an audio clip, a video frame, a photograph, and an image of signals (e.g., spectrograms, phasograms, scalograms, etc.), a combination thereof, or a portion thereof. The at least one storage unit may include any of the web sources 150, the local storage 127 of the user device 120, or a combination thereof.

According to an embodiment, upon receiving at least one variable captured or otherwise provided via the user device 120, the server 130 is configured to analyze the variable. The variables may include at least one of: personal variables associated with the user, environmental variables associated with the user device 120, and direct user inputs. The environmental variables may include, for example, a search history, a time of day, a list of social friends as posted on a social web site, location information, motion information, weather information, and so on. The personal variables may include any type of demographic information related to the user. The direct user inputs may include a search query that comprises text, audio or image inputs.

Based on the variables, the server 130 is configured to query a user profile stored in the data warehouse 160 to determine at least one current user interest. As a non-limiting example, environmental variables may indicate that the user device 120 is currently located in Manhattan and that it is currently morning. The user profile indicates that the user interacts with financial content on a daily basis. Thus, the current user interest may be determined to be "Wall Street articles" or "finance articles published in New York."

According to another embodiment, at least one data storage unit associated with the user of the user device 120 is crawled through to identify, based on the current user interest, multimedia content elements that are potentially interesting to the user. In an embodiment, the crawling may be based on a textual representation of the user interest.

In an embodiment, the server 130 is configured to send each potentially interesting multimedia content element identified to the SGS 140, the DCC system 170, or both. The decision as to whether the potentially interesting multimedia content elements are sent to the SGS 140 or to the DCC system 170 (or to both) may be predetermined or may be based on the request. In a further embodiment, the SGS 140 receives the potentially interesting multimedia content elements and returns at least one signature for each potentially interesting multimedia content element. The generated signatures may be robust to noise and distortion. The process for generating the signatures is discussed in detail herein below. In an alternative embodiment, the server 130 or the DCC system 170 may generate the signatures for the potential multimedia content elements.

According to an embodiment, the user device 120 may be configured to provide the server 130 with tracking information related to a multimedia content element viewed or uploaded by the user and the interaction of the user with the multimedia content element. In an example implementation, the user device 120 have installed thereon an agent (not shown) configured to collect and send tracking information to the server 130. The information may include, but is not limited to, the multimedia content element (or a URL referencing the multimedia content element), the amount of time the user viewed the multimedia content element, the user's gesture with respect to the multimedia content element, a URL of a webpage that the multimedia content elementwas viewed or uploaded to, and so on. The tracking information is provided for each multimedia content elementdisplayed on a user's web browser.

In an embodiment, the server 130 is configured to determine the user impression with respect to the received tracking information. The user impression may be determined per each multimedia content elementor for a group of multimedia content elements. As noted above, the user impression indicates the user attention with respect to an multimedia content element. In an embodiment, the server 130 may first filter the tracking information to remove details that cannot help in the determination of the user impression.

A user impression may be determined by, e.g., a user's click on an multimedia content element, a scroll, hovering over an multimedia content elementwith a mouse, change in volume, one or more key strokes, and so on. These impressions may further be determined to be either positive (i.e., demonstrating that a user is interested in the impressed multimedia content element) or negative (i.e., demonstrating that a user is not particularly interested in the impressed multimedia content element).

According to an embodiment, a filtering operation may be performed in order to analyze only meaningful impressions. Impressions may be determined as meaning measures and thereby ignored, e.g., if they fall under a predetermined threshold. For example, in an embodiment, if the user hovered over the MMCE using his mouse for a very short time (e.g., less than 0.5 seconds), then such a measure is ignored. In an embodiment, the filtering may be based on a score for the impression, where meaningful impressions have scores above a predetermined threshold. To this end, in a further embodiment, the server 130 is configured to compute a score for the impression.

In an embodiment, the server 130 is configured to send the multimedia content element or elements that are determined as having a positive user impression to the SGS 140. The SGS 140 is configured to generate at least one signature for each multimedia element or each portion thereof. The generated signature(s) may be robust to noise and distortions.

Based on the generated signatures, the server 130 is configured to search for similar multimedia content elements in a data source such as, but not limited to, the data warehouse 160, the local storage 127, a storage of the server 130, a combination thereof, and the like. In an embodiment, searching for similar multimedia content elements may include matching between the generated signatures and signatures representing the multimedia content elements in the data source. The matching may be based on similarities between signatures. An example process of matching between multimedia content elements is discussed in detail below with respect to FIGS. 4 and 5.

The server 130 is configured to analyze the potentially interesting multimedia content elements based on the generated signatures to determine whether the potentially interesting multimedia content elements match the current user interest. In an embodiment, the analysis may include identifying the source in which each multimedia content element was identified. The determination of whether the potentially interesting multimedia contents match the current user interest may further be based on the identified sources. For example, a website accessed by the user device 120 on a daily basis is more likely to include content that matches the user's current interests than generic content retrieved from a search engine. It is notes that in further embodiments, the analysis and comparison of the signatures are executed by the user device 120 instead of the server 130.

According to another embodiment, metadata associated with each potentially interesting multimedia content element may be identified by the server 130. The metadata may include, for example, a time pointer associated with the capture of each multimedia content element, a time pointer associated with the upload of each multimedia content element, a location pointer associated the capture of each multimedia content element, a location pointer associated with the upload of each multimedia content element, one or more tags added to each multimedia content element, a combination thereof, and the like.

In a further embodiment, such metadata may be analyzed, and the results of the metadata analysis may be utilized to, e.g., determine whether the multimedia content element is of interest to the user. For example, if a user interest is "Tennis," a multimedia content element associated with a location pointer indicating the geographic location of a tennis court may be of interest to the user.

According to another embodiment, the analysis of the potentially interesting multimedia content element may further be based on one or more concept structures (hereinafter referred to as "concepts"). A concept is a collection of signatures representing elements of the unstructured data and metadata describing the concept. As a non-limiting example, a 'Superman concept' is a signature-reduced cluster of signatures describing elements (such as multimedia elements) related to, e.g., a Superman cartoon: a set of metadata representing proving textual representation of the Superman concept. Techniques for generating concept structures are also described in U.S. Pat. No. 8,266,185 to Raichelgauz et al., which is assigned to the common assignee, and is incorporated hereby by reference for all that it contains.

In a further embodiment, a query is sent to the DCC system 170 to match an identified potentially interesting multimedia content element to at least one concept. The identification of a concept matching the identified multimedia content element includes matching at least one signature generated for the potentially interesting multimedia content element (which may be generated either by the SGS 140 or the DCC system 170) and comparing the generated potentially interesting multimedia content element signatures to signatures representing each concept. The matching can be performed across all concepts maintained by the system DCC 160.

In an embodiment, based on the analysis, the server 130 is configured to determine a multimedia content element that matches the user's interest and to cause customization of the user device 120 based on the interesting multimedia content element. To this end, in a further embodiment, the server 130 may be configured to obtain the interesting multimedia content and to send the interesting multimedia content element to the user device 120 for display.

Figure 2:
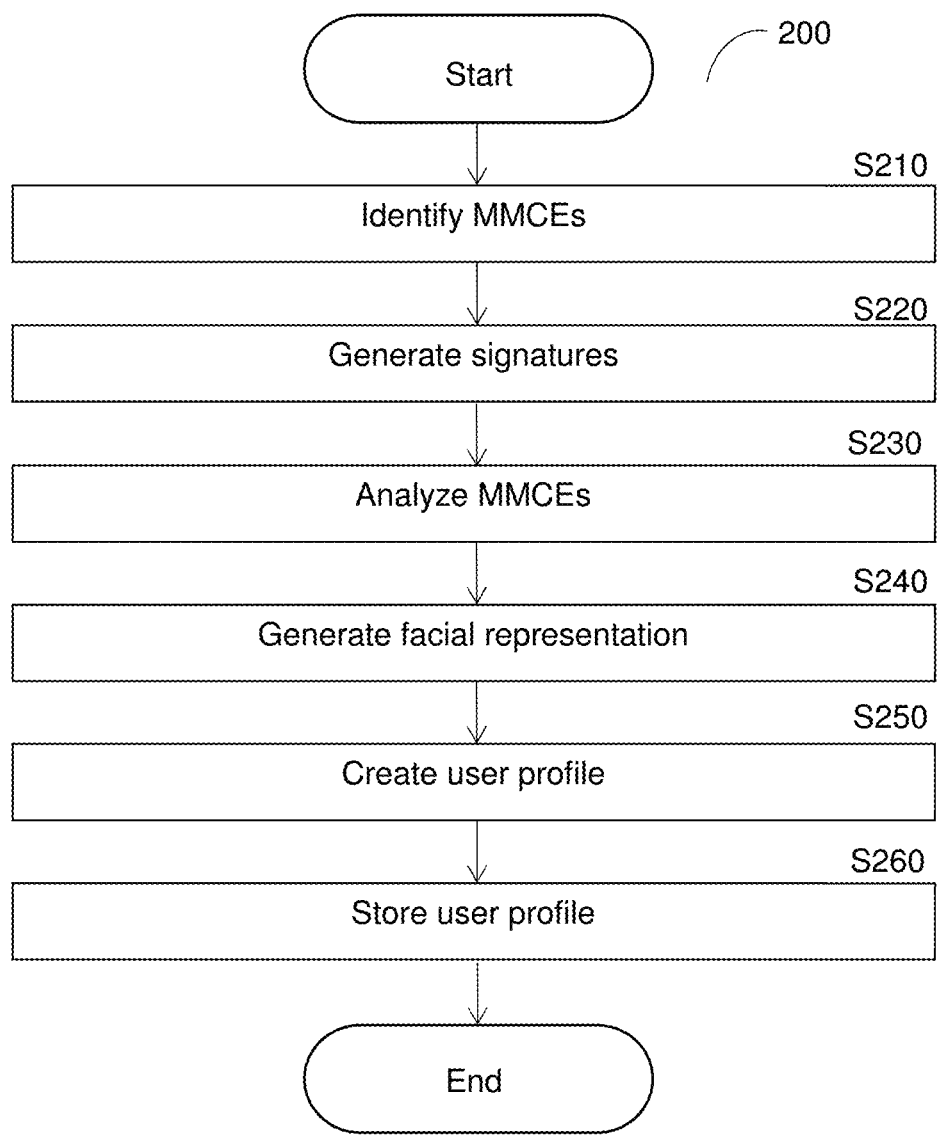
FIG. 2 is a flowchart illustrating a method for generating a user profile based on multimedia content elements according to an embodiment.

FIG. 2 depicts an example flowchart 200 illustrating a method for generating a user profile based on an analysis of multimedia content elements according to an embodiment. In an embodiment, the method may be performed by a server (e.g., the server 130). In another embodiment, the method may be performed by an interest analyzer (e.g., the interest analyzer 125 installed on the user device 120).

At S210, multimedia content elements are identified through one or more data sources associated with a user of a user device. The multimedia content elements may be identified based on a request for creating a user profile. The request may indicate, for example, particular multimedia content elements to be identified, data sources in which the multimedia content elements may be identified, metadata tags of multimedia content elements to be identified, combinations thereof, and the like.

In a further embodiment, S210 may include pre-filtering multimedia content elements that are unrelated to the user's face or to faces generally. To this end, S210 may further include analyzing metadata tags associated with multimedia content elements in the one or more data sources to identify multimedia content elements featuring the user's face. As a non-limiting example, if tags associated with a multimedia content element indicate that the multimedia content element does not show a person or, in particular, does not show the user, the multimedia content element may be pre-filtered out. The pre-filtering may reduce subsequent usage of computational resources due to, e.g., signature generation, concept correlation, and the like.

At S220, at least one signature is generated for each identified multimedia content element. In an embodiment, S220 may include generating a signature for one or more portions of any or all of the multimedia content elements. Each signature represents a concept associated with the multimedia content element. For example, a signature generated for a multimedia content element featuring a man in a costume may represent at least a "Batman®" concept. The signature(s) are generated by a signature generator (e.g., the SGS 140 or the signature generator 710) as described herein below with respect to FIGS. 4 and 5. The computational cores may be configured such that each resulting signature is robust to noise and distortion.

At S230, the identified multimedia content elements are analyzed based on the signatures. In an embodiment, the analysis includes determining a context of the identified multimedia content elements related to the user's face. In a further embodiment, the analysis includes determining, based on the context, multimedia content elements that optimally describe the user's face and generating a cluster including signatures representing the optimally descriptive multimedia content elements. Determining a context of multimedia content is described further herein below with respect to FIG. 3.

At optional S240, based on the analysis, a facial representation of the user of the user device is generated. In an embodiment, generating the facial representation may include filtering out multimedia content elements or portions thereof that are not related to the user's face. In an embodiment, generating the facial representation may include generating a cluster of signatures including signatures associated with multimedia content elements that optimally describe the face of the user. In another embodiment, generating the facial representation may include determining a list of facial features representing the user's face.

At S250, a user profile is generated. The user profile may include the facial representation. The user profile may further include metadata associated with one or more of the identified multimedia content elements, metadata associated with the user, or both. In a further embodiment, creating the user profile may include analyzing a plurality of multimedia content elements associated with the user to determine information related to the user such as, for example, interests of the user, contacts of the user (e.g., friends, family, and acquaintances), events the user has attended, a profession of the user, and the like. An example method and system for creating user profiles based on analysis of multimedia content elements is described further in U.S. patent application Ser. No. 14/280,928, which is assigned to the common assignee, which is hereby incorporated by reference for all that it contains.

At S260, the generated user profile is sent for storage in a storage such as, for example, the data warehouse 160.

Figure 3:
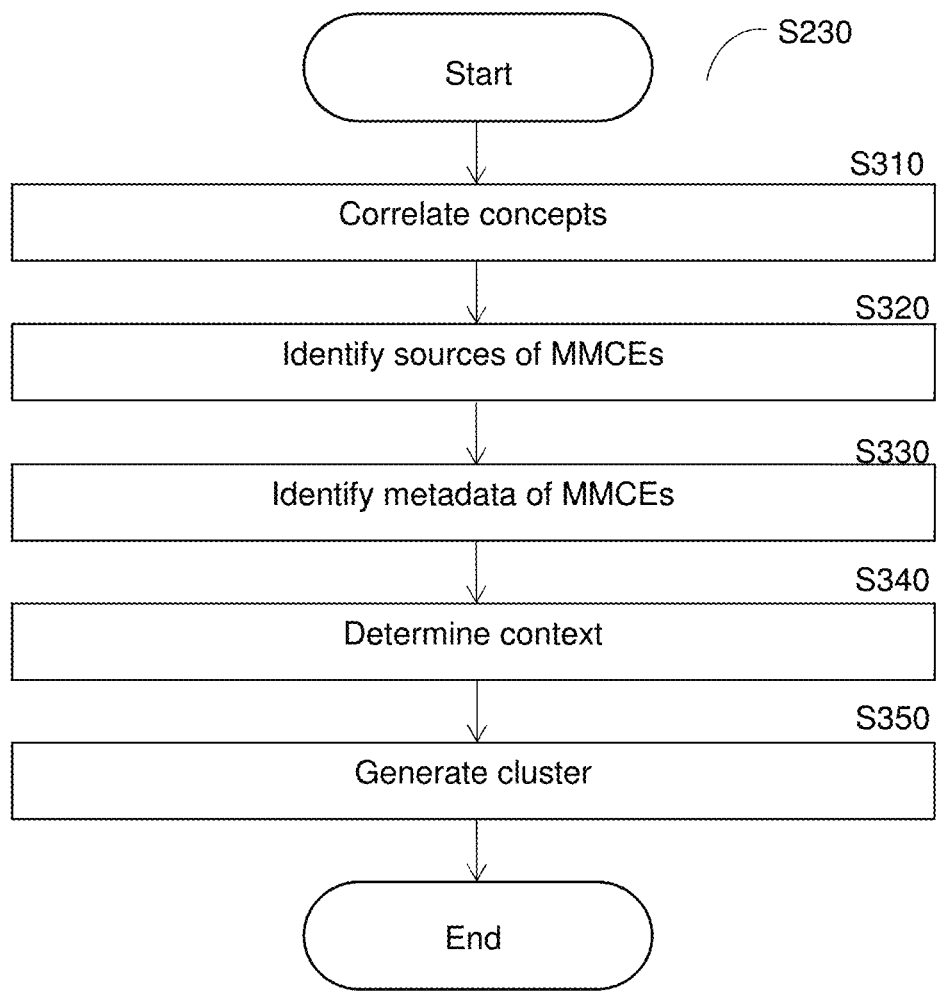
FIG. 3 is a flowchart illustrating a method for analyzing multimedia content elements based on concept structures according to an embodiment.

FIG. 3 depicts an example flowchart 300 illustrating a method for analyzing a plurality of multimedia content elements according to an embodiment. In an embodiment, the method is performed using signatures generated for the multimedia content elements.

At S310, a DCC system is queried with the generated signatures to identify at least one concept structure matching the multimedia content elements. The metadata of the matching concept structure is used for correlation between a first multimedia content element and at least a second multimedia content element of the plurality of multimedia content elements.

At optional S320, a source of each multimedia content element is identified. As further described hereinabove, the source of each multimedia content element may be indicative of the content and/or the context of the multimedia content element. In an embodiment, S320 may further include determining, based on the source of each multimedia content element, at least one potential context of the multimedia content element. In a further embodiment, each source may be associated with a plurality of potential contexts of multimedia content elements. As a non-limiting example, for a multimedia content stored in a source including video clips of basketball games, potential contexts may include, but are not limited to, "basketball," "the Chicago Bulls®," "the Golden State Warriors®," "the Cleveland Cavaliers®," "NBA®," "WNBA®," "March Madness®," and the like.

At optional S330, metadata associated with each multimedia content element is identified. The metadata may include, for example, a time pointer associated with a capture of each multimedia content element or with an upload of each multimedia content element, a location pointer associated with a capture of each multimedia content element or with an upload of each multimedia content element, one or more tags added to each multimedia content element, a combination thereof, and so on.

At S340, a context of the multimedia content elements is determined. In an embodiment, the context may be determined based on the correlation between a plurality of concepts related to multimedia content elements. The context may be further based on relationships between the multimedia content elements.

At S350, based on the determined context, a cluster including signatures related to multimedia content elements that optimally describe the user's face is generated. In an embodiment, S350 includes matching the generated signatures to a signature representing the determined context. Signatures matching the context signature above a predefined threshold may be determined to represent multimedia content elements that optimally describe the user's face. In a further embodiment, the cluster may be a signature reduced cluster.

Figure 4:
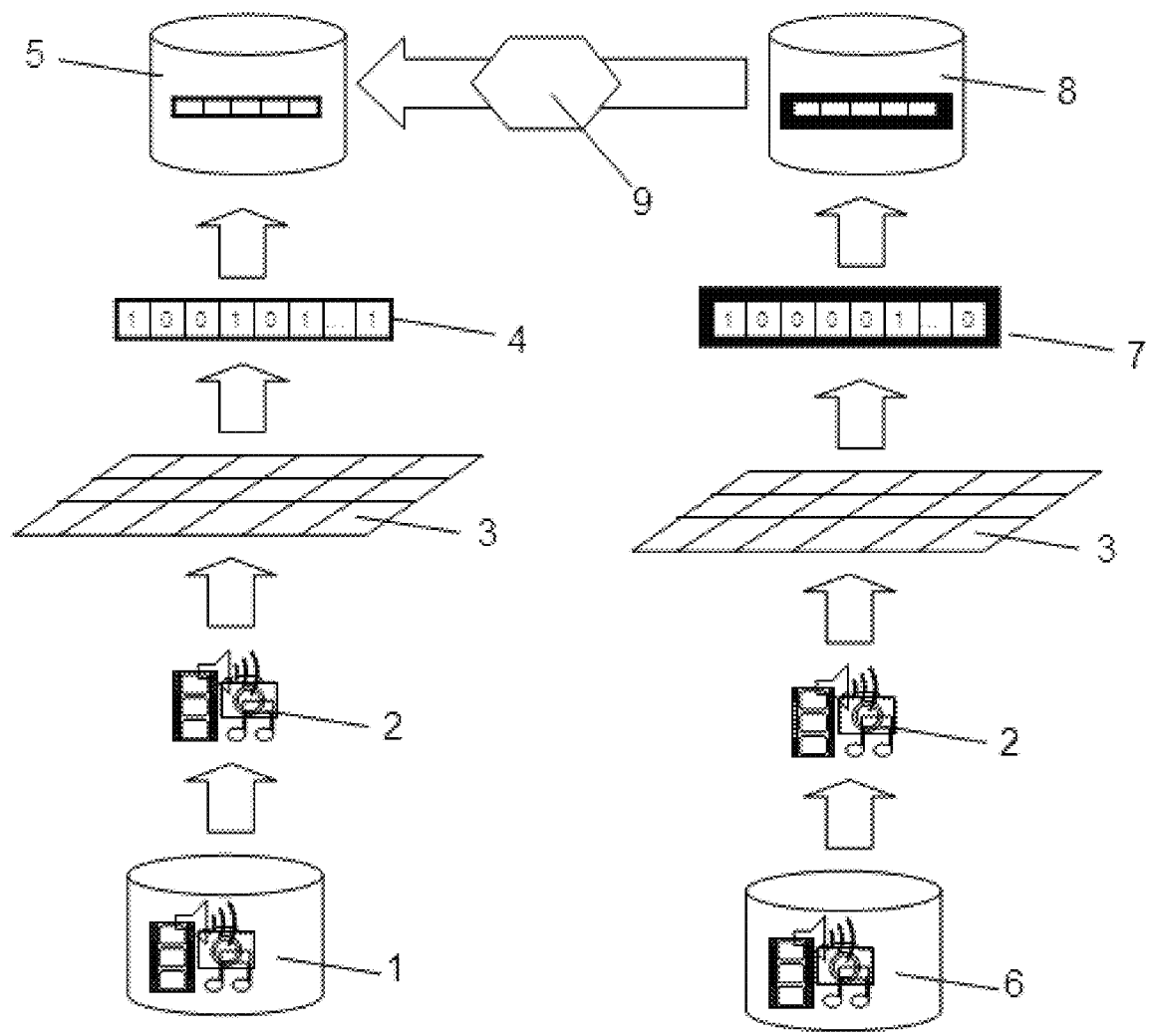
FIG. 4 is a block diagram depicting the basic flow of information in the signature generator system.
Figure 5:
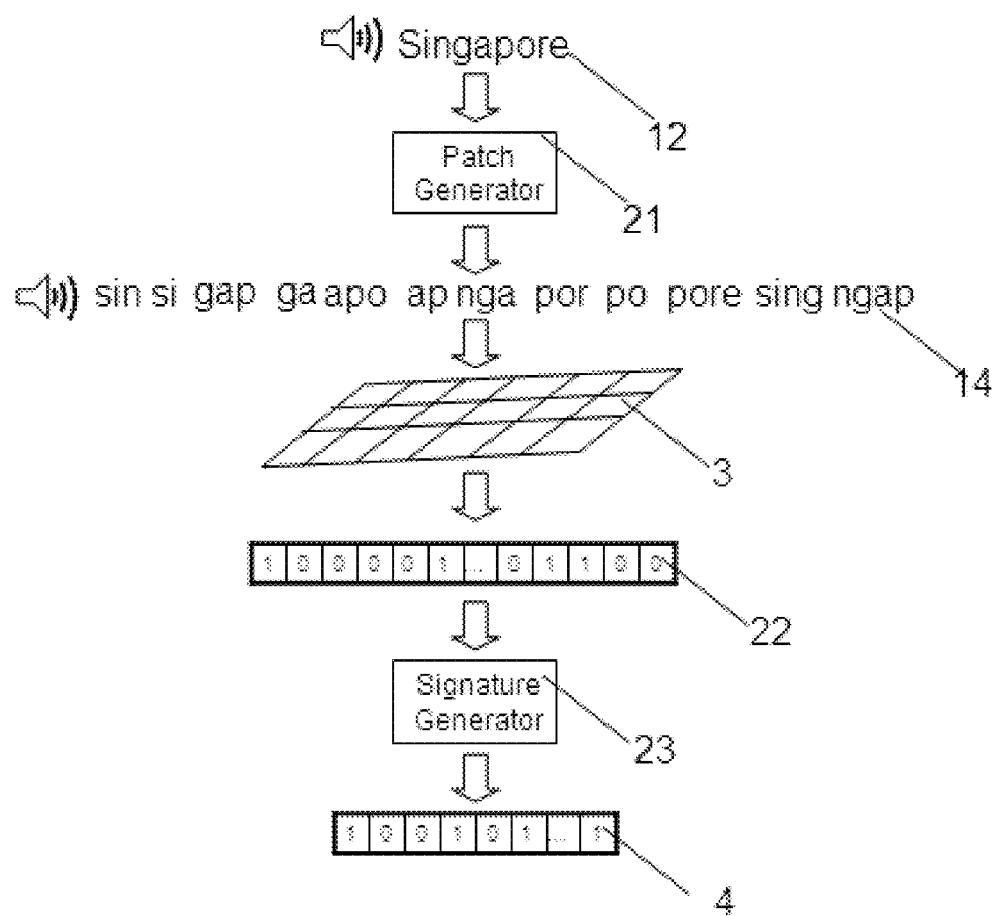
FIG. 5 is a diagram showing the flow of patches generation, response vector generation, and signature generation in a large-scale speech-to-text system.

FIGS. 4 and 5 illustrate the generation of signatures for the multimedia content elements by the SGS 140 according to one embodiment. An example high-level description of the process for large scale matching is depicted in FIG. 4. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An example process of signature generation for an audio component is shown in detail in FIG. 5. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames. In an embodiment the server 130 is configured with a plurality of computational cores to perform matching between signatures.

The Signatures' generation process is now described with reference to FIG. 5. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and the SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core Ci={$n_i$} (1≤i≤L) may consist of a single leaky integrate-to-threshold unit (LTU) node or more nodes. The node $n_i$ equations are:

$$V_i = \sum_j w_{ij} k_j$$

$$n_i = \theta(V_i - Th_x)$$

where, θ is a Heaviside step function; $w_{ij}$ is a coupling node unit (CNU) between node i and image component j (for example, grayscale value of a certain pixel j); kj is an image component 'j' (for example, grayscale value of a certain pixel j); $Th_x$ is a constant Threshold value, where 'x' is 'S' for Signature and 'RS' for Robust Signature; and Vi is a Coupling Node Value.

The Threshold values $Th_x$ are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

1: For: $V_i > Th_{RS}$
   $1-p(V > Th_S)-1-(1-\varepsilon)^l \ll 1$ i.e., given that l nodes (cores) constitute a Robust Signature of a certain image I, the probability that not all of these l nodes will belong to the Signature of same, but noisy image, $\tilde{I}$ is sufficiently low (according to a system's specified accuracy).

2: $p(V_i > Th_{RS}) \sim 1/L$ i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to the common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications A detailed description of the Computational Core generation and the process for configuring such cores is discussed in more detail in the above-referenced U.S. Pat. No. 8,655,801.

Figure 6:
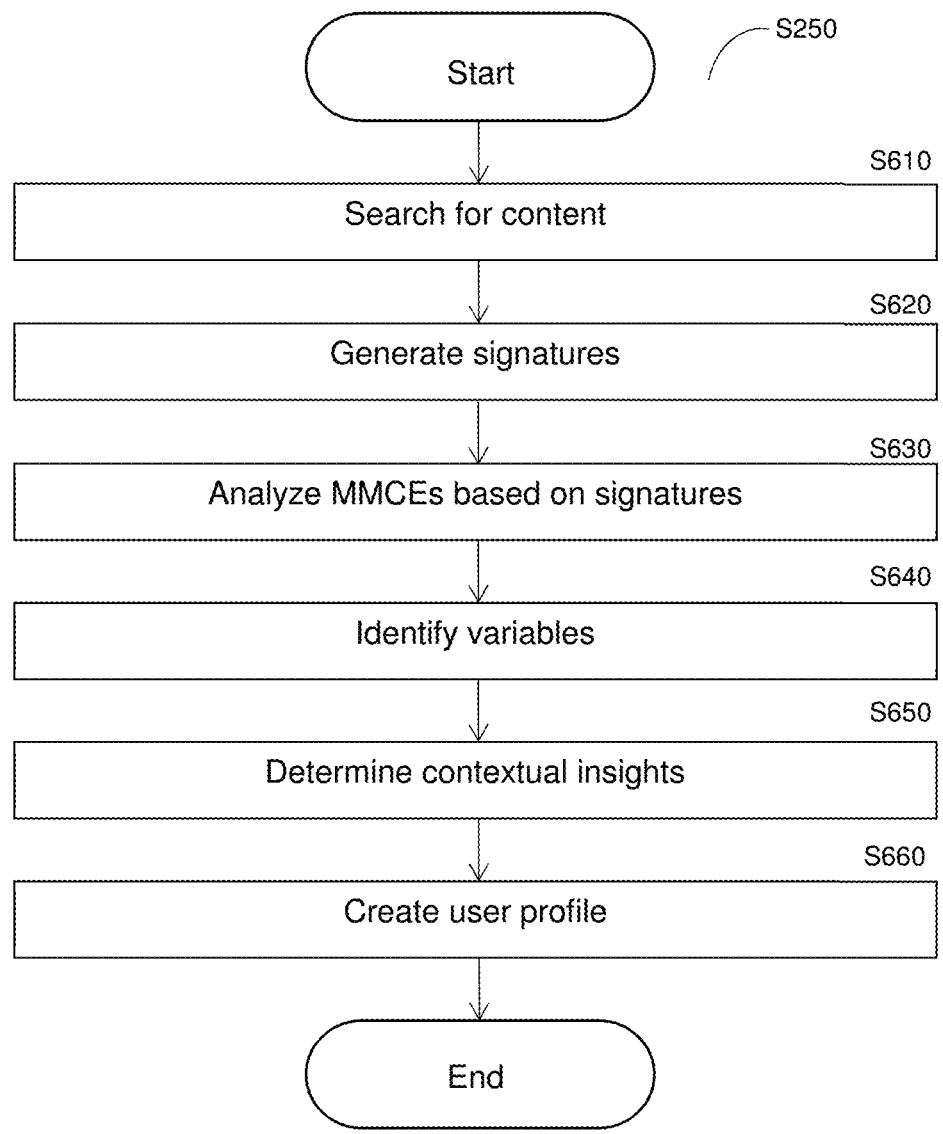
FIG. 6 is a flowchart illustrating a method for creating a user profile according to an embodiment.

FIG. 6 is an example flowchart S250 illustrating a method for creating a user profile based on an analysis of a plurality of multimedia content elements according to an embodiment.

At S610, a plurality of multimedia content elements associated with a user are identified through data sources accessible by a user device. The plurality of multimedia content elements may be identified based on, but not limited to, a request for recommendations, an existing user profile of the user, a combination thereof, and the like. The data sources may include web sources, a local storage of the user device, a local storage of a server, or a combination thereof.

In an embodiment, the plurality of multimedia content elements may be identified in response to storage of new multimedia content elements in the data sources. For example, if the data sources include a local storage in a smartphone of the user, the plurality of multimedia content elements may be identified when new images are captured by the smart phone and stored in the local storage. Such responsive identification allows for creation user profiles in real-time as new multimedia content elements are added to the data sources and, consequently, become associated with the user. Such real-time user profile creation further allows for automatically updating the user profile based on the most current interests of the user. For example, if a user initially does not have any pets, but subsequently purchases a puppy and begins taking pictures of the puppy, a new user profile indicating that the user is a dog owner may be created automatically.

At S620, at least one signature is identified for each identified multimedia content element. The signature(s) may be generated by a signature generator (e.g., the SGS 140) as described hereinabove with respect to FIGS. 4 and 5. It should also be noted that any of the signatures may be generated based on a portion of a multimedia content element.

At S630, the plurality of multimedia content elements is analyzed based on the generated signatures. In an embodiment, the analysis may include determining a context or one or more concepts of the signatures as described further herein above with respect to FIG. 3. In an embodiment, S630 may further include matching the concepts, the context, the signatures, or a combination thereof based on user interests of the user. In a further embodiment, the matching may include matching the concepts, the context, the signatures, or a combination thereof to signatures representing the user interests.

At S640, profile variables for creating the user profile are identified. Each of the profile variables is associated with the user or with the user device. The profile variables may include, but are not limited to, environmental variables, personal variables, and a combination thereof. The environmental variables may include, but are not limited to, at least one of: a search history, a time of day, a list of social friends as posted on a social web site, location information, motion information, weather information, network connection, and other user devices in proximity to the user device. The personal variables may include demographic information related to the user.

In an embodiment, S640 may further include identifying metadata associated with the user. The metadata may include, for example, a time pointer associated with the capture or upload of each multimedia content element, a location pointer associated with the capture or upload of each multimedia content element, one or more tags added to each multimedia content element, a combination thereof, and the like. In a further embodiment, S640 may include analyzing the identified metadata associated with the user to determine one or more variables associated with the user.

In S650, at least one contextual insight is generated based on the analysis of the identified multimedia content elements. The contextual insights are conclusions related to a preference of the user. For example, if a user interest is "motorcycles" and a concept related to multimedia content elements viewed by the user is "red vehicles," a contextual insight may be a user preference for "red motorcycles." As another example, if a user interest is "shopping" and a concept related to multimedia content elements viewed by the user is "located in Las Vegas, Nev.," a contextual insight may be a preference for shopping outlets in Las Vegas, Nev.

In an embodiment, S650 may include storing the signatures, concepts, contexts, profile variables, or a combination thereof, in a storage. In a further embodiment, only signatures, concepts, contexts, and profile variables related to currently identified multimedia content elements (e.g., generated for such multimedia content elements or otherwise determined in response to identification of such multimedia content elements) may be stored. Storing data related only to currently identified multimedia content elements allows for generating contextual insights based on current and previously identified data while minimizing use of storage due to, e.g., determining and re-storing data related to previously identified multimedia content elements.

In an embodiment, the at least one contextual insight may be generated further based on a time of capture or storage of each multimedia content element. To this end, in a further embodiment, S650 further includes analyzing metadata associated with each multimedia content element to determine a time of capture or storage thereof. In yet a further embodiment, the at least one contextual insight may be ranked or scored based on current relevance. Contextual insights that are ranked or scored below a predetermined threshold may be determined to be currently irrelevant. The ranking or scoring may be based on, but not limited to, a time of capture or storage of multimedia content elements related to each contextual insight, a number of multimedia content elements associated with each contextual insight, a combination thereof, and the like.

At S660, a user profile is created based on the contextual insights. In an embodiment, the user profile includes associations between each contextual insight and at least one of the identified variables. The associations between contextual insights and variables may be utilized to determine, for example, current user interests based on recent identification of particular variables. In an embodiment, the generated user profile may be sent for storage in, for example, a storage (e.g., the data warehouse 160).

Figure 7:
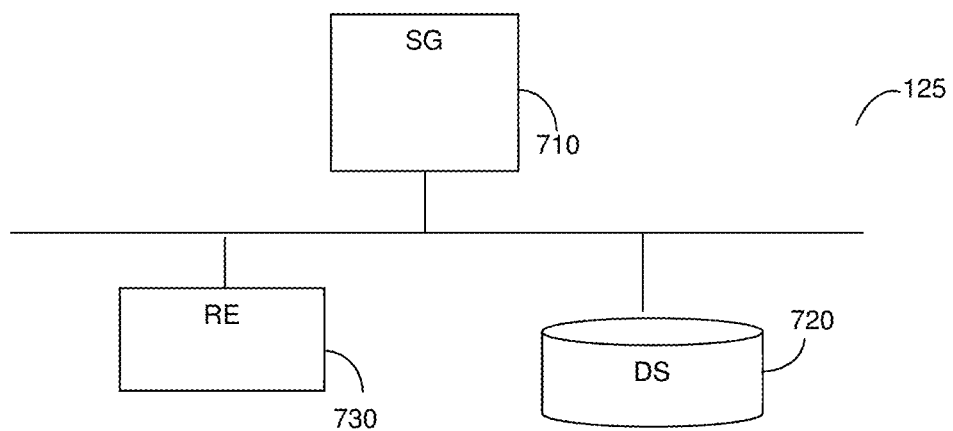
FIG. 7 is a schematic block diagram of an interest analyzer according to an embodiment.

FIG. 7 depicts an example block diagram of an interest analyzer 125 installed on the user device 120 according to an embodiment. The interest analyzer 125 may be configured to access an interface of a user device or a server. The interest analyzer 125 is further communicatively connected to a processing system (e.g., a processing system of the user device 120 or of the server 130, not shown) such as a processor and to a memory (e.g., a memory of the user device 120 or of the server 130, not shown). The memory contains therein instructions that, when executed by the processing system, configures the interest analyzer 125 as further described hereinabove and below. The interest analyzer 125 may further be communicatively connected to a storage unit (e.g., the local storage 127 of the user device 120 or a local storage of the server 130, not shown) including a plurality of multimedia content elements.

In an embodiment, the interest analyzer 125 includes a signature generator (SG) 710, a data storage (DS) 720, and a display customization engine 730. The signature generator 710 may be configured to generate signatures for multimedia content elements. In a further embodiment, the signature generator 710 includes a plurality of computational cores as discussed further herein above, where each computational core is at least partially statistically independent of the other computations cores.

The data storage 720 may store a plurality of multimedia content elements, a plurality of concepts, signatures for the multimedia content elements, signatures for the concepts, or a combination thereof. In a further embodiment, the data storage 720 may include a limited set of concepts relative to a larger set of known concepts. Such a limited set of concepts may be utilized when, for example, the data storage 720 is included in a device having a relatively low storage capacity such as, e.g., a smartphone or other mobile device, or otherwise when lower memory use is desirable.

The display customization engine 730 may be configured to identify contextual insights based on user profiles, to determine current user interests based on the contextual insights, to query sources of information (including, e.g., the data storage 720 or another data source) to identify interesting multimedia content elements (i.e., related to at least one user interest in a user profile), and to cause a display of interesting multimedia content elements on the user device 120.

According to an embodiment, the interest analyzer 125 is configured to receive at least one multimedia content element. The interest analyzer 125 is configured to initialize a signatures generator (SG) 710 to generate at least one signature for the received at least one multimedia content element. The memory further contains instructions to query a user profile of the user stored in a data storage (DS) 720 to determine a user interest. The memory further contains instructions to generate a contextual insight based on the user interest and the at least one signature. Based on the contextual insight, a recommendations engine 730 is initialized to search for one or more content items that match the contextual insight. The matching content items may be provided by the recommendations engine 730 to the user as recommendations via the interface.

Each of the display customization engine 730 and the signature generator 710 can be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In certain implementations, the display customization engine 730, the signature generator 710, or both can be implemented using an array of computational cores having properties that are at least partly statistically independent from other cores of the plurality of computational cores. The computational cores are further discussed herein above with respect to FIGS. 3 and 4.

According to another implementation, the processes performed by the display customization engine 730, the signature generator 710, or both can be executed by a processing system of the user device 120 or of the server 130. Such processing system may include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

It should be noted that, although FIG. 7 is described with respect to an interest analyzer 125 included in the user device 120, any or all of the components of the interest analyzer 125 may be included in another system or systems (e.g., the server 130, the signature generator system 140, or both) and utilized to perform some or all of the tasks described herein without departing from the scope of the disclosure. As an example, the interest analyzer 125 operable in the user device 120 may send multimedia content elements to the signature generator system 140 and may receive corresponding signatures therefrom. As another example, the user device 120 may send signatures to the server 130 and may receive corresponding interesting multimedia content elements therefrom. As yet another example, the interest analyzer 125 may be included in the server 130 and may provide interesting multimedia content elements to the user device 120 based on multimedia content elements identified by or received from the user device 120.

Figure 8:
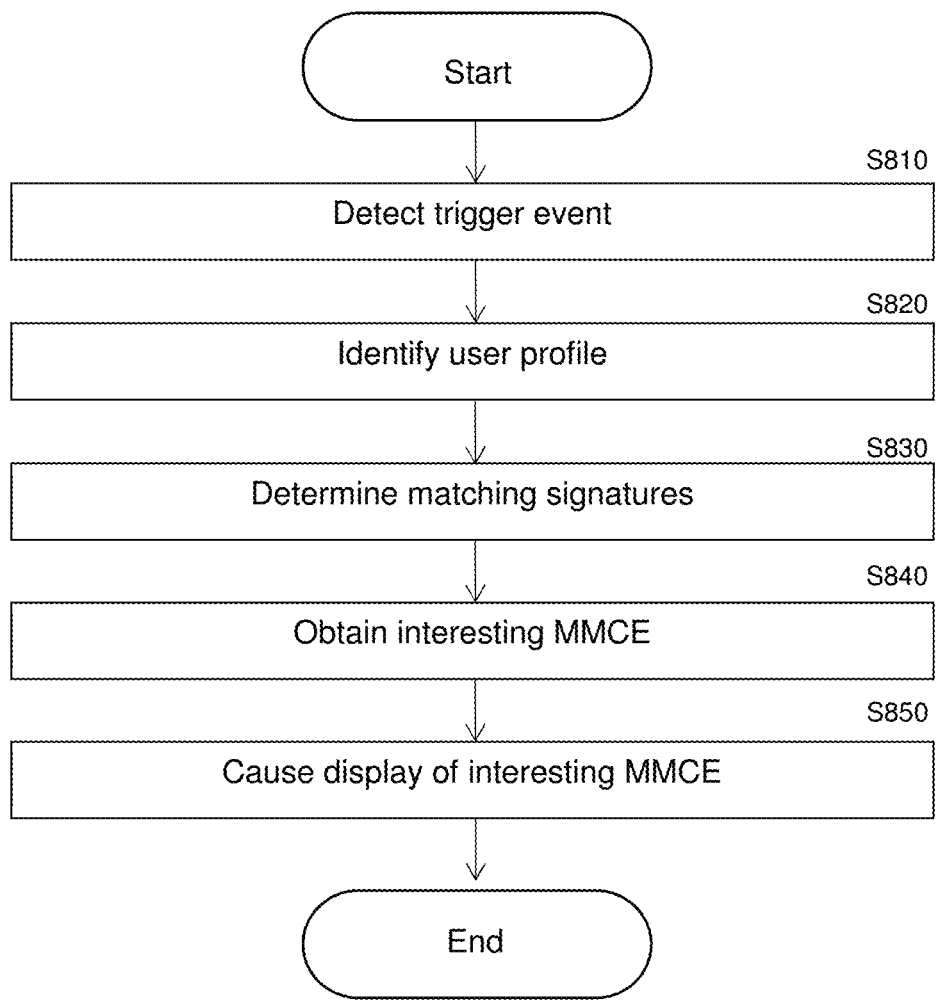
FIG. 8 is a flowchart illustrating a method for customizing a display of a user device based on multimedia content element signatures according to an embodiment.

FIG. 8 is an example flowchart 800 illustrating a method for customizing a display of a user device based on multimedia content elements according to an embodiment.

At S810, a display customization trigger event is detected. In an embodiment, the customization trigger event may include, but is not limited to, receiving a request to customize a display of a user device, identification of at least one trigger variable, and the like. In a further embodiment, the at least one trigger variable may be at least one predetermined value and may include, but is not limited to: personal variables associated with the user, environmental variables associated with the user device, and user inputs. The personal variables may include any type of demographic information related to the user such as, but not limited to, gender or age. The environmental variables may include, but are not limited to, a search history, a time of day, a list of social friends as posted on a social web site, location information, motion information, weather information, and so on. The user inputs may include, but are not limited to, a textual, image-based, or audio-based search query. The trigger variables may be received from, e.g., the user device to be customized.

At S820, a user profile is identified. In an embodiment, the user profile is a user profile created as described herein above with respect to FIG. 6. The user profiles includes one or more signatures, contextual insights, or a combination thereof, that indicate certain user preferences and interests. For example, the user profile may indicate that a user has an interest in outdoor activities in general, or mountain biking in particular. In an embodiment, the user profile is retrieved from a data warehouse. In a further embodiment, the user profile is stored locally on a user device.

At S830, an interesting multimedia content element to be displayed is determined with respect to the identified user profile. In an embodiment, S830 includes comparing signatures of the user profile to a plurality of signatures associated with multimedia content elements in at least one data source. The data sources may include, but are not limited to, the user device for which the display is to be customized, at least one other user device, a local storage, one or more web sources, a combination thereof, and the like. The interesting multimedia content element may have a signature matching at least one signature indicating a user interest of the user profile above a predetermined threshold. Each of the signatures of the user profile may indicate a user interest. Alternatively or collectively, signatures representing contextual insights of the user profile may be compared to the plurality of signatures associated with multimedia content elements.

In an embodiment, when it is determined that a plurality of signatures of multimedia content elements match signatures of the user profile, the interesting multimedia content elements to be displayed may be selected from among the plurality of matching multimedia content elements. In a further embodiment, the selection may be based on the trigger variables such that the selected multimedia content element is relevant with respect to a current user interest. The current user interests may be based on associations between variables and contextual insights of the user profile as described further herein above with respect to FIG. 6.

At optional S840, the determined interesting multimedia content element may be obtained. In an embodiment, S840 may include retrieving the interesting multimedia content element.

At S850, interesting multimedia content element is caused to be displayed on the user device. In an embodiment, S850 may include sending the interesting multimedia content element to the user device.

As a non-limiting example, when a user is passing by a bicycle shop, a trigger event may be detected based on an environmental variable indicating a location of a user device carried by the user. A user profile of the user is identified. Signatures of the user profile are compared to signatures of a plurality of multimedia content elements stored in a server of a social media website to determine an interesting image showing a person riding a bicycle. The image is obtained from the social media website server and sent to the user device for display It should be noted that FIG. 8 is described with respect to customizing a display using one interesting multimedia content element merely for simplicity purposes and without limitation on the disclosed embodiments. Multiple interesting multimedia content elements may be equally determined and caused to be displayed on the user device without departing from the scope of the disclosure. As a non-limiting example, a images of a dog and a cat, respectively, may be caused to be displayed, e.g., simultaneously in different portions of the display, as a slideshow, and the like.

The method discussed herein with reference to FIG. 8 can be performed by the server (e.g., server 130, FIG. 1) or a user device (e.g., a user device 120, FIG. 1).

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a step in a method is described as including "at least one of A, B, and C," the step can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for customizing a display of a user device based on multimedia content element signatures, comprising:
    detecting a trigger event;
    upon detecting the trigger event, identifying a user profile of the user device, wherein the user profile includes at least one signature of at least one multimedia content element associated with the user, the at least one signature is indicative of at least one user interest, each one of the at least one signature belongs to a concept that comprises the signature and metadata representing the concept;
    wherein each signature is generated by a signature generator including a plurality of computational cores, each computational core having properties that are at least partially statistically independent of properties of the other computational cores, wherein the properties of each computational core are set independently of the properties of each other core;
    comparing the at least one signature of the user profile to a plurality of signatures of multimedia content elements;
    determining, based on the comparison, at least one interesting multimedia content element, wherein the at least one interesting multimedia content element is relevant to at least one of the at least one user interest; and
    customizing the display of the user device, wherein the customized display includes the at least one interesting multimedia content element.

2. The method of claim 1, further comprising: generating at least one user profile, wherein each user profile is generated based on of the at least one multimedia content element associated with the user, wherein the at least one user profile is associated with a user of the user device.

3. The method of claim 2, wherein generating each user profile further comprises:
    identifying a plurality of multimedia content elements associated with the respective user;
    generating at least one signature for each of the plurality of multimedia content elements associated with the user;
    analyzing the generated at least one signature to identify at least one concept matching the multimedia content elements associated with the user;
    generating, based on the at least one matching concept, at least one contextual insight, wherein each contextual insight indicates a preference of the user; and
    generating, based on the at least one contextual insight, the user profile for the user.

4. The method of claim 1, wherein the computational cores are configured such that each generated signature is robust to noise and distortion.

5. The method of claim 1, where the trigger event is detected based on at least one trigger variable.

6. The method of claim 5, wherein the at least one trigger variable includes at least one of: at least one personal variable associated with a user of the user device, at least one environmental variable associated with the user device, and at least one user input.

7. The method of claim 6, wherein the at least one personal variable includes demographic information related to the user.

8. The method of claim 6, wherein the at least one environmental variable includes at least one of: a user search history, a time of day, a list of social friends as posted on a social web site, user device location information, user device motion information, and weather information.

9. The non-transitory computer readable medium of claim 1, where the trigger event is detected based on at least one trigger variable.

10. The non-transitory computer readable medium of claim 9, wherein the at least one trigger variable includes at least one of: at least one personal variable associated with a user of the user device, at least one environmental variable associated with the user device, and at least one user input.

11. The non-transitory computer readable medium of claim 10, wherein the at least one personal variable includes demographic information related to the user.

12. The non-transitory computer readable medium of claim 10, wherein the at least one environmental variable includes at least one of: a user search history, a time of day, a list of social friends as posted on a social web site, user device location information, user device motion information, and weather information.

13. A non-transitory computer readable medium having stored thereon instructions for causing one or more processing units to execute a method, the method comprising:
   detecting a trigger event;
   upon detecting the trigger event, identifying a user profile of the user device, wherein the user profile includes at least one signature of at least one multimedia content element associated with the user, the at least one signature is indicative of at least one user interest, each one of the at least one signature belongs to a concept that comprises the at least one signature and metadata representing the concept;
   wherein each signature is generated by a signature generator including a plurality of computational cores, each computational core having properties that are at least partially statistically independent of properties of the other computational cores, wherein the properties of each computational core are set independently of the properties of each other core;
   comparing the at least one signature of the user profile to a plurality of signatures of multimedia content elements;
   determining, based on the comparison, at least one interesting multimedia content element, wherein the at least one interesting multimedia content element is relevant to at least one of the at least one user interest; and
   customizing the display of the user device, wherein the customized display includes the at least one interesting multimedia content element.

14. The non-transitory computer readable medium of claim 13, having stored thereon instructions for: generating at least one user profile, wherein each user profile is generated based on of the at least one multimedia content element associated with the user, wherein the at least one user profile is associated with a user of the user device.

15. The non-transitory computer readable medium of claim 14, wherein generating each user profile further comprises:
   identifying a plurality of multimedia content elements associated with the respective user;
   generating at least one signature for each of the plurality of multimedia content elements associated with the user;
   analyzing the generated at least one signature to identify at least one concept matching the multimedia content elements associated with the user;
   generating, based on the at least one matching concept, at least one contextual insight, wherein each contextual insight indicates a preference of the user; and
   generating, based on the at least one contextual insight, the user profile for the user.

16. The non-transitory computer readable medium of claim 13, wherein the computational cores are configured such that each generated signature is robust to noise and distortion.

17. A system for customizing a display of a user device based on multimedia content element signatures, comprising:
   a processing circuitry; and
   a memory, the memory containing instructions that, when executed by the processing circuitry, configure the system to:
   detecting a trigger event;
   upon detecting the trigger event, identifying a user profile of the user device, wherein the user profile includes at least one signature of at least one multimedia content element associated with the user, the at least one signature is indicative of at least one user interest, each one of the at least one signatures belongs to a concept that comprises the at least one signature and metadata representing the concept;
   wherein each signature is generated by a signature generator including a plurality of computational cores, each computational core having properties that are at least partially statistically independent of properties of the other computational cores, wherein the properties of each computational core are set independently of the properties of each other core;
   comparing the at least one signature of the user profile to a plurality of signatures of multimedia content elements;
   determining, based on the comparison, at least one interesting multimedia content element, wherein the at least one interesting multimedia content element is relevant to at least one of the at least one user interest; and
   customizing the display of the user device, wherein the customized display includes the at least one interesting multimedia content element.

18. The method of claim 17, further comprising: generating at least one user profile, wherein each user profile is generated based on the at least one multimedia content element associated with the user, wherein the at least one user profile is associated with a user of the user device.

19. The method of claim 18, wherein generating each user profile further comprises:
   identifying a plurality of multimedia content elements associated with the respective user;
   generating at least one signature for each of the plurality of multimedia content elements associated with the user;
   analyzing the generated at least one signature to identify at least one concept matching the multimedia content elements associated with the user;
   generating, based on the at least one matching concept, at least one contextual insight, wherein each contextual insight indicates a preference of the user; and
   generating, based on the at least one contextual insight, the user profile for the user.

20. The method of claim 17, wherein the computational cores are configured such that each generated signature is robust to noise and distortion.

21. The method of claim 17, where the trigger event is detected based on at least one trigger variable.

22. The method of claim 21, wherein the at least one trigger variable includes at least one of: at least one personal variable associated with a user of the user device, at least one environmental variable associated with the user device, and at least one user input.

23. The method of claim 22, wherein the at least one personal variable further includes demographic information related to the user.

24. The method of claim 22, wherein the at least one environmental variable includes at least one of: a user search history, a time of day, a list of social friends as posted on a social web site, user device location information, user device motion information, and weather information.

* * * * *